(12) United States Patent
Szymczak et al.

(10) Patent No.: US 11,164,463 B2
(45) Date of Patent: Nov. 2, 2021

(54) BRAKE PERFORMANCE MONITORING FOR VEHICLE PLATOONING OPERATION

(71) Applicant: Bendix Commercial Vehicle Systems LLC, Elyria, OH (US)

(72) Inventors: Scott Szymczak, Elyria, OH (US); Andrew J. Pilkington, Avon Lake, OH (US); Timothy Carritte, Jr., Avon Lake, OH (US); T. Stephen Miller, Jr., Elyria, OH (US); William P. Amato, Avon, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 271 days.

(21) Appl. No.: 15/857,925

(22) Filed: Dec. 29, 2017

(65) Prior Publication Data

US 2019/0206261 A1   Jul. 4, 2019

(51) Int. Cl.
*G08G 1/00* (2006.01)
*B60T 17/22* (2006.01)
(Continued)

(52) U.S. Cl.
CPC ............... *G08G 1/22* (2013.01); *B60T 8/885* (2013.01); *B60T 17/22* (2013.01); *B60W 30/16* (2013.01);
(Continued)

(58) Field of Classification Search
CPC ........ G08G 1/22; G08G 1/161; G05D 1/0295; G05D 1/0293; B60T 17/22; B60W 30/16; B60W 30/165
See application file for complete search history.

(56) References Cited

U.S. PATENT DOCUMENTS 5,299,452 A   4/1994   Caron et al.
5,467,645 A   11/1995  Skorupski et al.
(Continued)

FOREIGN PATENT DOCUMENTS

EP   2326540       3/2010
JP   3851410 B2    11/2006
(Continued)

OTHER PUBLICATIONS

International Search Report and Written Opinion from correlating International Application No. PCT/US2018/067075, dated Apr. 3, 2019; 12 pages.
(Continued)

*Primary Examiner* — Alan D Hutchinson
*Assistant Examiner* — Andy Schneider
(74) *Attorney, Agent, or Firm* — Tucker Ellis LLP

(57) ABSTRACT

Vehicle brake performance monitoring is provided. The braking capabilities are dynamically learned or otherwise calculated or determined in each vehicle and shared between the vehicles of the platoon. The platoon may be reorganized based on differences between the learned or otherwise calculated or determined relative braking capabilities. Desired gaps between the platooning vehicles may be modified in accordance with the learned or otherwise calculated or determined relative braking capabilities as necessary or desired. During every vehicle stop, the vehicle and axle loads together with information on the time from brake apply to when the vehicle decelerates is monitored and entered as a data point defining the vehicle response delay. The axle loads and the ABS Activation of a wheel end for a given pressure is further selectively used to create another data point. The data points are selectively used to develop overall performance (e.g., quality score) of the brake system.

20 Claims, 10 Drawing Sheets

(51) Int. Cl.
*B60W 30/16* (2020.01)
*G05D 1/02* (2020.01)
*G08G 1/01* (2006.01)
*G08G 1/16* (2006.01)
*H04L 29/08* (2006.01)
*B60W 30/165* (2020.01)
*B60T 8/88* (2006.01)

(52) U.S. Cl.
CPC ......... *B60W 30/165* (2013.01); *G05D 1/0293* (2013.01); *G08G 1/0112* (2013.01); *G08G 1/161* (2013.01); *H04L 67/12* (2013.01); *B60T 2270/406* (2013.01)

(56) References Cited

U.S. PATENT DOCUMENTS

| | | | |
|---|---|---|---|
| 5,681,992 | A | 10/1997 | Klein et al. |
| 6,032,097 | A | 2/2000 | Iihoshi et al. |
| 6,332,354 | B1* | 12/2001 | Lalor ................ B60T 8/00 701/70 |
| 8,788,176 | B1 | 7/2014 | Yopp |
| 8,874,346 | B2 | 10/2014 | Kontz et al. |
| 9,632,507 | B1 | 4/2017 | Korn |
| 2006/0097569 | A1 | 5/2006 | Eberling et al. |
| 2010/0256852 | A1 | 10/2010 | Mudalige |
| 2011/0276220 | A1 | 11/2011 | Sato |
| 2013/0211624 | A1 | 8/2013 | Lind et al. |
| 2016/0026187 | A1 | 1/2016 | Alam et al. |
| 2016/0054735 | A1* | 2/2016 | Switkes ............. H04W 4/44 701/23 |
| 2017/0308097 | A1 | 10/2017 | Switkes |
| 2017/0344023 | A1 | 11/2017 | Laubinger |
| 2019/0171226 | A1* | 6/2019 | Kim .................... G05D 1/0293 |

FOREIGN PATENT DOCUMENTS

| | | |
|---|---|---|
| WO | 2010023426 | 3/2010 |
| WO | 2014145918 A1 | 9/2014 |
| WO | 2016030699 A1 | 3/2016 |

OTHER PUBLICATIONS

Bishop, R. et al., "Automated Driving and Platooning Issues and Opportunities", White Paper, Automated Driving and Platooning Task Force, ATA Technology and Maintenance Council Future Truck Program, Sep. 21, 2015, pp. 1-48. USA, http://orfe.princeton.edu/~alaink/SmartDrivingCars/ITFVHA15/ITFVHA15_USA_FutureTruck_ADP_TF_WhitePaper_Draft_Final_TF_Approved_Sept_2015.pdf.

Lin, M., et al., "A Study and Analysis for Calculating the Brake-application Time of AEB Systems Considering the Gradient", Paper, International Journal of Control and Automation, vol. 8, No. 6 (2015). pp. 283-292, Korea.

Freund, D. et al., "Commercial Vehicle Safety Technologies: Applications for Brake Performance Monitoring", Paper, Federal Motor Carrier Safery Administration, pp. 1-14, Paper No. 09-0097, USA.

MGM Brakes, "Electronic Brake Monitoring", Sales Flier, Form No. 5091, 2 pages, Revised Jul. 201, printed in the USA.

* cited by examiner

BRAKE PERFORMANCE MONITORING FOR VEHICLE PLATOONING OPERATION

CROSS REFERENCE TO RELATED APPLICATIONS

This application is related to U.S. application Ser. No. 15/856,851, filed Dec. 28, 2017, entitled: SENSOR-BASED ANTI-TRACKING PREVENTION IN PLATOONING VEHICLES; U.S. application Ser. No. 15/856,390, filed Dec. 28, 2017, entitled: INITIALIZATION AND SAFETY MAINTENANCE STRATEGY FOR PLATOONING VEHICLES; U.S. application Ser. No. 15/850,942, filed Dec. 21, 2017, entitled: DETERMINING AND USING BRAKING CAPABILITIES OF VEHICLES FOR PLATOONING DECELERATION OPERATIONS; U.S. application Ser. No. 15/395,160, filed Dec. 30, 2016, entitled: VARYING THE DISTANCE BETWEEN VEHICLES IN A PLATOON; U.S. application Ser. No. 15/395,219, filed Dec. 30, 2016, entitled: SELF-ORDERING OF FLEET VEHICLES IN A PLATOON; U.S. application Ser. No. 15/395,251, filed Dec. 30, 2016, entitled: DETECTION OF EXTRA-PLATOON VEHICLE INTERMEDIATE OR ADJACENT TO PLATOON MEMBER VEHICLES; and U.S. application Ser. No. 15/395,214, filed Dec. 30, 2016, entitled: "V" SHAPED AND WIDE PLATOON FORMATIONS, the contents of each of these applications being incorporated herein by reference in their entirety.

TECHNICAL FIELD

The embodiments herein relate generally to highway vehicle brake performance monitoring and platoon management. More specifically, particular embodiments relate to commercial highway vehicle platoon management where it is desirable to arrange two or more vehicles cooperatively travelling seriatim as a platoon along an associated roadway into a platoon arrangement in accordance with their relative braking capabilities and other brake-related performance characteristics. Although the embodiments will be described with reference to selected particular brake performance monitoring examples, it is to be appreciated that the claimed invention is also amenable to other applications and can be equivalently extended to other embodiments and environments.

BACKGROUND

It is known that two or more vehicles moving along a roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane. Larger platoons can involve many follower vehicles for providing enhanced efficiency, but ensuring the safety of to both the platooned vehicles as well as of the other non-platooning vehicles on the roadway most usually dictate the short single lane platoon incarnation.

The aerodynamic geometry of the vehicles within a platoon is a significant factor used in determining an ordering of the vehicles. As a general rule, a physically smaller vehicle following a physically larger vehicle will provide a greater benefit. Since commercial box trucks and tractors towing box trailers are in general taller and wider than most flatbed tractor trailer combinations, a maximum aerodynamic benefit and resultant fuel savings is realized by ordering vehicles classified this way such that the commercial box truck and tractors towing box trailers take the leader position(s) in the platoon, while the flatbed tractor trailer rigs take the follower position(s) in the platoon.

In addition to the above, maintaining a small distance or spacing between platooned vehicles gives greater benefit in terms of reduced energy consumption. However, holding a tight distance or spacing between platooned vehicles requires that careful attention be paid to various functional or environmental and operational characteristics and capabilities of the vehicles and other external conditions including the overall size of the platoon, weather conditions, relative braking abilities between vehicle pairs, relative acceleration abilities, relative load or cargo size and weight including required stopping distance, and the like. Special attention must also be paid to characteristics of the roadway such as roadway incline, decline, and turn radii. These various parameters implicate directly or indirectly the inter-vehicle safety considerations as well as the overall safety of multiple vehicle platoons.

In the single lane platoon incarnation described above, the vehicles participating in a platoon typically mutually cooperate to maintain a relatively fixed and constant (even or the same) distance between adjacent vehicles by exchanging deceleration command and other signals between adjacent vehicles of the platoon. On flat roadways, the even distance maintained between the vehicles is often fixed and constant in accordance with control protocols using combinations of global positioning systems (GPS) data sharing, deceleration command signal exchanges, and safety and efficiency algorithms. On graded roadways, the relatively even distance maintained between the vehicles is often modified to improve or otherwise maintain or enhance the overall safety and efficiency of the platoon. For example, the even distance maintained between the vehicles can be decreased during conditions of the platoon traversing an incline wherein the tendency of the overall platoon is to decrease speed slightly. Conversely, the even distance maintained between the vehicle can be increased during conditions of the platoon traversing a decline wherein the tendency of the overall platoon is to increase speed slightly. In any case, the relative distance between the vehicles of the platoon preferably remains substantially even, constant or the same in accordance with platoon control mechanisms and protocols in place.

For maintaining the preferred relatively fixed and constant (even or the same) distance between adjacent vehicles, many commercial vehicles that participate in platoons are highly sophisticated and are also equipped with adaptive cruise control (ACC) systems including forward and rearward sensors used for maintaining a safe relative distance between a host vehicle and a forward vehicle, and collision mitigation (CM) systems for avoiding or lessening the severity of impacts between a host and forward and rearward vehicles using various combinations of transmission, vehicle retarder, and foundation brake controls.

In addition to the above, vehicles participating in a platoon typically share their positions with other vehicles of the platoon by communicating their GPS coordinate data with other vehicles using vehicle-to-vehicle (V2V) communications ("V2V Unicast" communications), and/or vehicle-2-vehicles (V2x) communications ("V2V Multicast" communications), and/or any other suitable communications that might be available. One SAE standard is J2945 directed in general to Dedicated Short Range Communication (DSRC), and a work in process portion of that standard is J2945/6 is directed to performance requirements for cooperative adaptive cruise control and platooning. J2945/6 is intended to define the data exchange that will be necessary for coordinated platoon maneuvers, and that definition of the categories should start with differentiating between platooning and ACC, then determining message sets and performance to realize cooperative vehicles.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish the relatively even distance coordinated between the vehicles as generally described above.

Platooning vehicles follow each other on the roadway in close proximity to each other and often at highway speeds as explained above, and for this they typically use a Radar to control the inter-vehicle distance(s). For the lateral control using automatic steering control, Lane Departure Systems track the lane markings and actively steer the vehicles between the detected lane lines and/or marks. For emergency braking situations such as Autonomous Emergency Braking (AEB) events for example, forward-directed cameras on a following vehicle detect the actuation by a forward vehicle of a rearward facing brake light so that appropriate emergency stopping or other actions can suitably be initiated.

Platoons that operate on public roadways, however, sometimes encounter conditions that require more complicated platoon arrangements and brake monitoring and platooning control and maintenance operations. For example, many roadways are open to vehicular traffic including non-commercial private traffic having little or no interaction with the platooning vehicles other than sharing a common roadway. Sometimes in practice the non-platooning vehicles, typically comprising small fast automobiles, dart into the path of the platoon, typically comprising large heavily loaded trucks. Therefore and in the interest of protecting the lighter passenger traffic from inadvertent collision with platooning vehicles, a particular platoon order or arrangement has been devised. More particularly, in order to optimize the safety of non-platooning vehicles that might interfere with the leading or any other vehicle of the platoon group, many platoons are ordered so that the platoon vehicle that is capable of the highest deceleration is placed at the front of the platoon. This helps to mitigate the chance that the platoon leader will be unable to adequately decelerate in order to avoid a collision with the non-platooning vehicle darting into the path of the platoon. In this platoon topology, the platooning vehicles having the lightest braking capabilities or parameters are located at the back of the platoon chain. This platoon topology also gives the rear vehicle more time gap for braking.

In roadway vehicles, however, braking efficiency is affected by many factors such as brake temperature, brake type, burnishing, vehicle weight, number of tires, tire wear, vehicle loading, road surface type and weather conditions. In addition, the braking efficiency of any vehicle can also change over time, and also can change differently for each vehicle. One or more changes in braking capabilities and any other braking performance characteristics of a first vehicle of a set of platooning vehicles does not necessarily imply that any of the other vehicles of the set of platooning vehicles are experiencing the same one or more changes. That is, one or more changes in braking capabilities of a first vehicle in a platoon cannot reliably be imputed any of the other vehicles of the platoon. This makes the important platoon management of gap distances between the platooning vehicles more difficult.

Given the above, therefore, it will be helpful to dynamically learn or otherwise calculate or determine the braking capability and braking performance parameters of each platooning vehicle over time.

It would further also be helpful to dynamically monitor, learn or otherwise calculate or determine the braking capability and braking performance parameters of each platooning vehicle individually or on a per-vehicle basis over time, and to use the brake performance information and other performance parameters as criteria for determining inter-vehicle following distances, maintenance scheduling and other useful vehicle support functions based on the monitored braking performance information to maximize equipment value and to enhance the safety of the platooning as well as the non-platooning vehicles.

It would also be helpful to dynamically learn or otherwise calculate or determine the braking capability and braking performance parameters of each platooning vehicle and of each platooning vehicle relative to the other vehicles of the platoon over time, and to use the relative braking capability and braking performance parameters as criteria for determining the order of the vehicles of the platoon to maximize the safety of the non-platooning vehicles relative to the platooning vehicles.

SUMMARY OF THE EXAMPLE EMBODIMENTS

The embodiments herein provide for new and improved systems and methods for dynamically monitoring, learning or otherwise calculating or determining the braking capability and braking performance parameters of each platooning vehicle over time.

The embodiments herein provide for new and improved systems and methods for dynamically learning or otherwise calculating or determining the braking capability and braking performance parameters of each platooning vehicle relative to the other vehicles of the platoon over time.

The embodiments herein provide for new and improved systems and methods for using the relative braking capability and braking performance parameters of the platooning vehicles learned or otherwise calculated or determined over time as criteria for determining the order and/or re-ordering of the vehicles of the platoon to maximize the safety of the non-platooning vehicles relative to the platooning vehicles.

In accordance with another aspect, a platoon management control system and method uses braking performance data representative of the braking capabilities of the platooning vehicles to manage the gap distances between the vehicles to help ensure that the vehicles do not collide during braking operations.

In accordance with yet a further aspect, during vehicle decelerations, the vehicle and axle loads together with information on the amount of time that passes between the vehicle control system receiving a deceleration command signal such as when for example an operator applies force to a brake pedal, and the desired deceleration of the vehicle being achieved is monitored and entered as a data point defining the vehicle response delay. The axle loads and the ABS Activation of a wheel end for a given pressure is further selectively used to create another data point. The data points are selectively used to develop overall performance (e.g., quality score) of the brake system.

In accordance with another aspect, the monitored performance of the brake system is selectively used to define other variables related to the operation of the vehicle such as time taken for the system to respond, and to quantify the deceleration the vehicle may be able to achieve for a given vehicle and axle loading, etc.

In accordance with yet another aspect, the information of the monitored brake performance could then be used to inform the operator that vehicle brake system maintenance is required or to inform the operator a recommended order that a vehicle must be placed within a platoon.

In accordance with yet another aspect, the information of the monitored brake performance is used to adjust the inter-vehicle following distance to always maintain an appropriate following distance based on the information of the monitored brake performance.

In accordance with yet another aspect, the information of the monitored brake performance used to place the vehicle with more braking capability as the "following" vehicle within a platoon.

In accordance with an example embodiment, a system is provided for determining a braking capability of an associated vehicle of a set of platooning vehicles comprising the associated vehicle and an associated leading vehicle cooperatively travelling as a platoon along an associated roadway. The system according to the example embodiment includes a platoon control unit configured to be disposed in the associated following vehicle. The system further includes a vehicle speed sensor operatively coupled with the platoon control unit, a vehicle brake sensor operatively coupled with the platoon control unit, and a timer operatively coupled with the platoon control unit.

The platoon control unit of the example system embodiment comprises a processor, a non-transient memory device operatively coupled with the processor, and logic stored in the non-transient memory wherein the logic is executable by the processor to perform brake performance monitoring for vehicle platooning operation.

The vehicle speed sensor of the example system embodiment is preferably disposed in the associated following vehicle and is operable to sense a relative speed between the associated following vehicle and the associated roadway, and generate relative speed data representative of the sensed relative speed between the associated following vehicle and the associated roadway.

The vehicle brake sensor of the example system embodiment is preferably disposed in the associated following vehicle and is operable to sense activation of a braking system of the associated following vehicle.

The timer of the example system embodiment is preferably disposed in the associated following vehicle and is operable to determine timer interval data representative of a time difference between a first time and a second time.

The logic of the platoon control unit of the example system embodiment is executable by the processor to: determine at a first time an initiation of the activation of the braking system in accordance with a first signal from the vehicle brake sensor; determine at a second time a cessation of the activation of the braking system in accordance with a second signal from the vehicle brake sensor; and generate first braking quality data in accordance with a predetermined combination of the relative speed data at the first time, the relative speed data at the second time, and the timer interval data. In the example system embodiment, the first braking quality data is representative of a real-time quantification of brake system performance of the associated following vehicle.

In accordance with a further example embodiment, a method is provided for determining a braking capability of an associated following vehicle of a set of platooning vehicles comprising the associated following vehicle and an associated leading vehicle cooperatively travelling seriatim as a platoon along an associated roadway. In the method embodiment, a platoon control unit is provided for being disposed in the associated following vehicle. The provided platoon control unit comprises a processor, a non-transient memory device operatively coupled with the processor, and logic stored in the non-transient memory wherein the logic is executable by the processor to perform brake performance monitoring for vehicle platooning operation.

The example method includes using a vehicle speed sensor operatively coupled with the platoon control unit and configured to be disposed in the associated following vehicle to sense a relative speed between the associated following vehicle and the associated roadway, and to generate relative speed data representative of the sensed relative speed between the associated following vehicle and the associated roadway.

The example method further includes using a vehicle brake sensor operatively coupled with the platoon control unit and configured to be disposed in the associated following vehicle to sense activation of a braking system of the associated following vehicle.

The example method further includes using a timer operatively coupled with the platoon control unit and configured to be disposed in the associated following vehicle to determine timer interval data representative of a time difference between a first time and a second time.

The logic of the platoon control unit is executed in the example method embodiment by the processor to determine at a first time an initiation of the activation of the braking system in accordance with a first signal from the vehicle brake sensor, determine at a second time a cessation of the activation of the braking system in accordance with a second signal from the vehicle brake sensor, and generate first braking quality data in accordance with a predetermined combination of the relative speed data at the first time, the relative speed data at the second time, and the timer interval data. In the example method embodiment, the first braking quality data is representative of a real-time quantification of brake system performance of the associated following vehicle.

Other embodiments, features and advantages of the example embodiments for brake performance monitoring for vehicle platooning operation will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
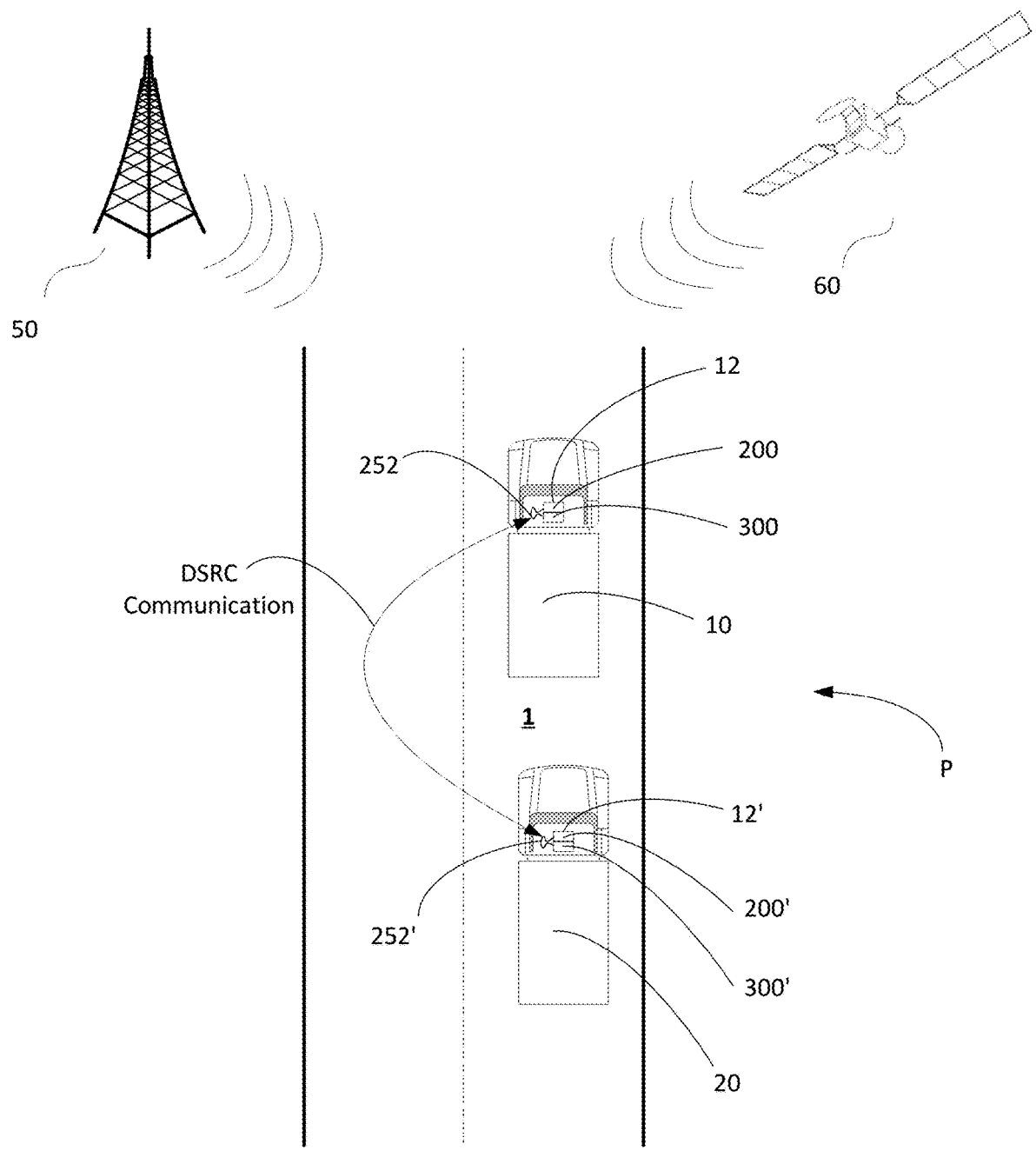
FIG. 1 is a schematic depiction of operation of an exemplary platoon in accordance with the embodiments.

Referring now to the drawings, wherein the showings are for the purpose of illustrating the example embodiments for platoon initialization, redundant lane departure control, and redundant communication operation only, and not for purposes of limiting the same, FIG. 1 illustrates a basic platoon P including a host or leader vehicle 10 in traffic with a second or follower vehicle 20 in accordance with the present disclosure. As shown, the follower vehicle 20 is traveling proximate to the leader vehicle 10 in an ordered platoon P along a roadway 1. In the example embodiment shown, the follower vehicle 20 is traveling proximate to the leader vehicle 10 seriatim along the roadway 1 in the example platoon P. However, it is to be appreciated that the platoon P can take on any arrangement of vehicle conformation in accordance with further embodiments. The leader vehicle 10 is provided with an electronic control system 12 which includes a data collection and communication module portion 200 (FIG. 2) and a platooning control portion 300 (FIG. 3) to be described in greater detail below. Similarly, the follower vehicle 20 is also provided with an electronic control system 12' which includes a data collection and communication module portion 200' similar to the data collection and communication module portion 200 of the leader vehicle 10, and a platooning control portion 300' similar to the platooning control portion 300 of the leader vehicle 10. In the example embodiments to be described herein, each of the two or more vehicles comprising the various platoons that will be described include the same or equivalent electronic control system 12, the same or equivalent data collection and communication module portion 200, and the same or equivalent platooning control portion 300. However, it is to be appreciated that other control systems having the functionality to be described herein may equivalently be used as necessary or desired.

In the example embodiment illustrated, the electronic control systems 12, 12' of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to inter-vehicle platoon distance and/or spacing management i.e. platoon ordering and spacing beneficially without the need to consult with or act under the direction of or in concert with the remote wireless communication system 50, the remote satellite system 60, the remote fleet management facility, a Network Operations Center (NOC), a Central Command Center (CCC), or the like.

In addition to the above, the electronic control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon P can communicate with each other locally for self-ordering and spacing into a platoon without the need for input from the NOC in accordance with the embodiments herein. The vehicles forming the basic platoon P can also communicate with one or more other vehicles locally without the need for input from the NOC for negotiating the one or more other vehicles into the platoon in accordance with the embodiments herein. The vehicles forming the basic platoon P can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

Figure 2:
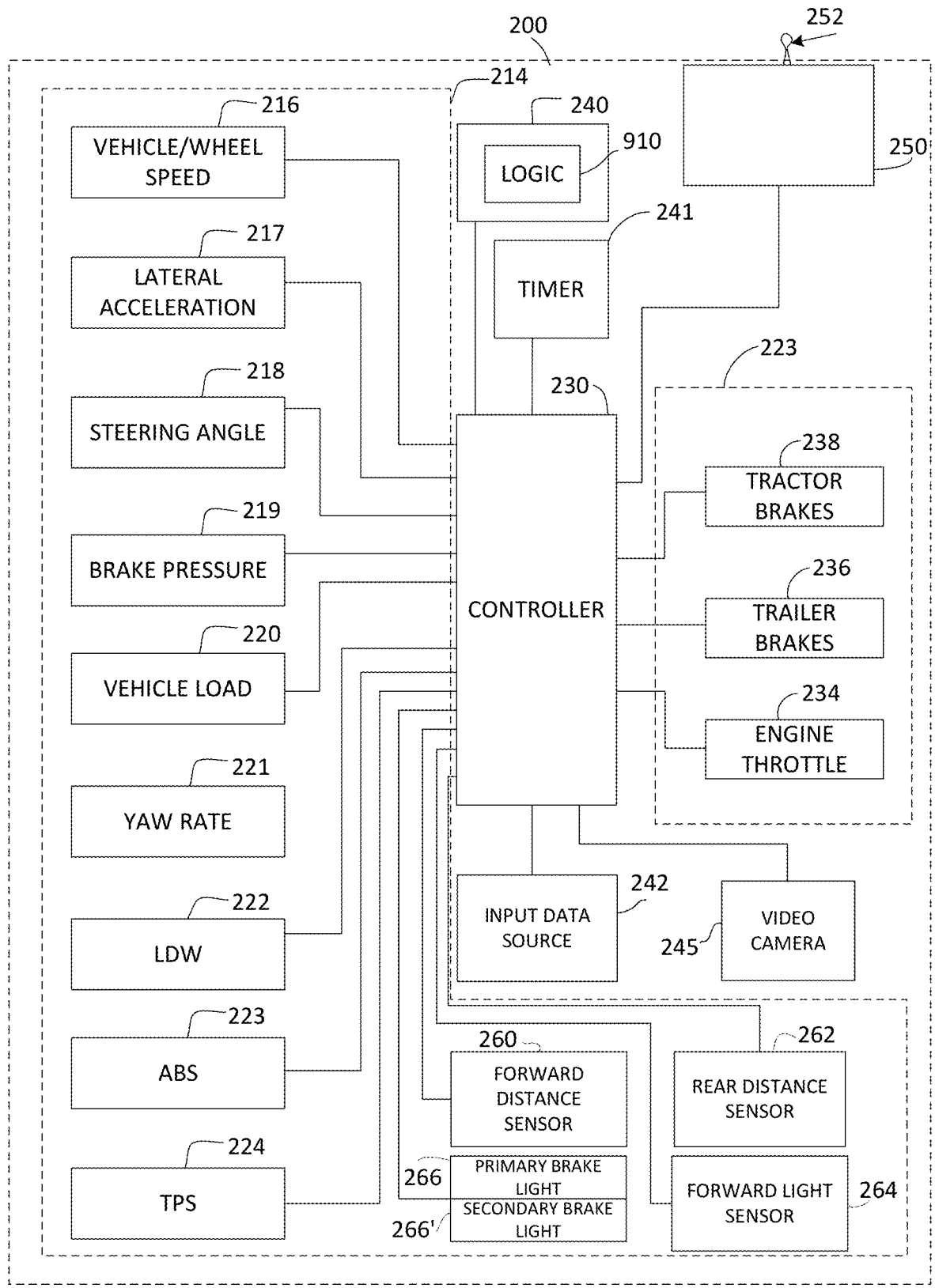
FIG. 2 is a schematic illustration of an exemplary embodiment of a data collection and communication module portion of the subject platoon control system for brake performance monitoring for vehicle platooning operation according to the example embodiment.

With reference next to FIG. 2, a schematic representation of a data collection and communication module portion 200 of the subject system for new and improved systems and methods for brake performance monitoring for vehicle platooning operation according to principles of the example embodiment is illustrated. Other vehicle arrangements for platooning are possible according to principles of the example embodiments including for example non-columnar formation, V-shaped formations, and others for example. The data collection and communication module 200 may be adapted to detect, monitor, and report a variety of operational parameters and conditions of the commercial vehicle and the driver's interaction therewith, and to selectively intervene and take corrective action as may be needed or desired such as, for example, to maintain vehicle stability or to maintain the vehicle following distance relative to other vehicles within a platoon. In the exemplary embodiment of FIG. 2, the data collection and communication module 200 may include one or more devices or systems 214 for providing input data indicative of one or more operating parameters or one or more conditions of a commercial vehicle. For example, the devices 214 may be one or more sensors, such as but not limited to, one or more wheel speed sensors 216, a lateral acceleration sensor 217, a steering angle sensor 218, a brake pressure sensor 219, a vehicle load sensor 220, a yaw rate sensor 221, a lane departure warning (LDW) sensor or system 222, and a tire pressure (TPMS) monitoring system 224. The data collection and communication module 200 may also utilize additional devices or sensors in the exemplary embodiment including for example a forward distance sensor 260, a rear distance sensor 262, one or more rear lights such as a primary rear brake light 266 and a secondary rear brake light 266', a forward light sensor 264, and an ABS system activation sensor 223. Other sensors and/or actuators or energy generation devices or combinations thereof may be used of otherwise provided as well, and one or more devices and/or sensors may be combined into a single unit as may be necessary and/or desired.

The data collection and communication module 200 may also include a logic applying arrangement 230, such as a controller or processor, in communication with the one or more devices or systems 214. The controller 230 may include one or more inputs for receiving input data from the devices or systems 214. The controller 230 may be adapted to process the input data and compare the raw or processed input data to a stored threshold value and/or to one or more others signal and/or data. The controller 230 may also include one or more outputs for delivering a control signal to one or more vehicle systems 232 based on the comparison. The control signal may instruct the systems 232 to intervene in the operation of the vehicle to initiate corrective action, and then report this corrective action to a wireless service (not shown) or simply store the data locally to be used for determining a driver quality. For example, the controller 230 may generate and send the control signal to an engine electronic control unit or an actuating device to reduce the engine throttle 234 and slowing the vehicle down. Further, the controller 230 may send the control signal to a vehicle brake system to selectively engage the brakes. The controller 230 may send the control signal to selectively activate the primary and or secondary brake lights 266, 266' for reasons to be described below including for example to communicate information to following vehicles as may be deemed necessary or desired. In a tractor-trailer arrangement, the controller 230 may engage the brakes on one or more wheels of a trailer portion of the vehicle 236 and the brakes on one or more wheels of a tractor portion of the vehicle 238, and then report this corrective action to the wireless service or simply store the data locally to be used for determining a driver quality. A variety of corrective actions may be possible and multiple corrective actions may be initiated at the same time.

The controller 230 may also include a memory portion 240 for storing and accessing system information, such as for example the system control and/or control tuning logic 910. The memory portion 240, however, may be separate from the controller 230. The sensors 214 and controller 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix® ESP® system may utilize some or all of the sensors described in FIG. 2. The logic component of the Bendix® ESP® system resides on the vehicle's antilock brake system electronic control unit, which may be used for the controller 230 of the present invention. Therefore, many of the components to support the data collection and communication module 200 of the present invention may be present in a vehicle equipped with the Bendix® ESP® system, thus, not requiring the installation of additional components. The data collection and communication module 200, however, may utilize independently installed components if desired.

The controller 230 may also include a timer portion 241 operable to time stamp one or more events and/or determine one or more timer intervals between selected one or more events. In the example embodiment, the timer is operable to determine a time interval a time interval (INT) between a first time (T1) and a second time (T2), and generate time interval data (INT_data) representative of the determined time interval (INT).

The data collection and communication module 200 may also include a source of input data 242 for receiving data indicative of a configuration/condition of a commercial vehicle, data indicative of environmental conditions around the vehicle, or the like. The controller 230 may sense or estimate the configuration/condition and/or the environmental conditions around the vehicle based on the input data, and may select a control tuning mode or sensitivity based on the vehicle configuration/condition. The controller 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 200 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 230 is operatively coupled with one or more video image capture devices shown in the example embodiment as a single video camera 245 representation of one or more physical video cameras disposed on the vehicle such as, for example, one video camera on each corner of the vehicle.

Still yet further, the data collection and communication module 210 may also include a transmitter/receiver (transceiver) module 250 such as, for example, a radio frequency (RF) transmitter including one or more antennas 252 for wireless communication of GPS data, one or more various vehicle configuration and/or condition data, or the like between the vehicles and one or more destinations such as, for example, to one or more wireless services 50, 60 (FIG. 1) having a corresponding receiver and antenna. The transmitter/receiver (transceiver) module 250 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The controller 230 is operative to communicate the acquired data to the one or more receivers in a raw data form, that is without processing the data, in a processed form such as in a compressed form, in an encrypted form or both as may be necessary or desired. In this regard, the controller 230 may combine selected ones of the vehicle parameter data values into processed data representative of higher level vehicle condition data such as, for example, data from the lateral acceleration sensor 217 may be combined with the data from the steering angle sensor 218 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

Figure 3:
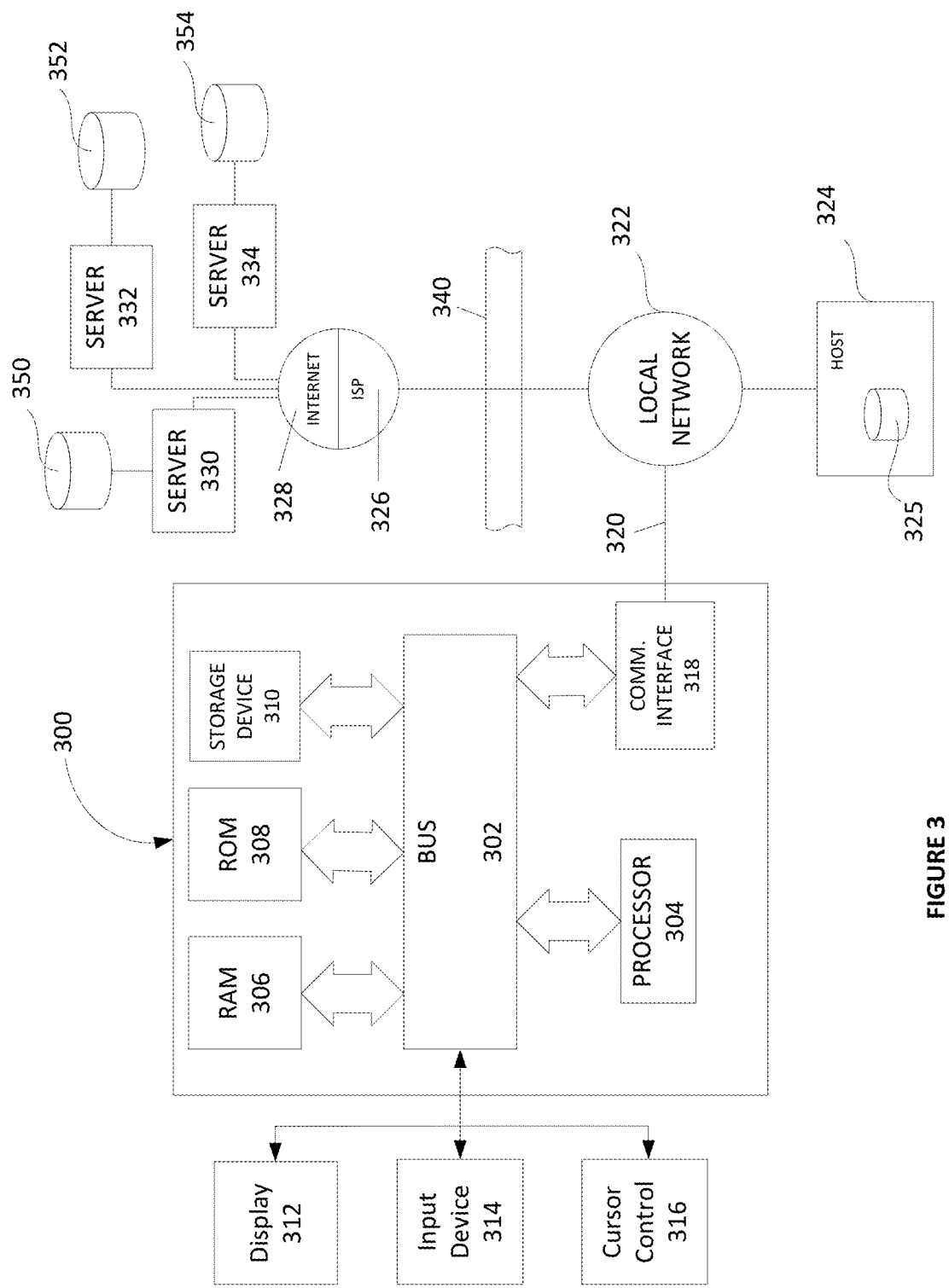
FIG. 3 is a block diagram that illustrates an exemplary embodiment of a computer system suitable for executing embodiments of one or more software systems or modules that perform brake performance monitoring for vehicle platooning operation according to the example embodiment.

FIG. 3 is a block diagram that illustrates a platoon control computer system 300 suitable for executing embodiments of one or more software systems or modules that perform brake performance monitoring according to the subject application. The controller 230 of FIG. 2 may be in an example embodiment provided as the computer system 300 illustrated, for example. The example system 300 of the embodiment includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. A storage device 310 is also suitably provided for storing information and instructions.

The example embodiments described herein are related to the use of the computer system 300 for accessing, aggregating, manipulating and displaying information from multiple remote resources such as, for example, indirectly from multiple fleet vehicles 10, 20 and directly from multiple wireless services 50, 60. Further, the embodiments described herein are related to the use of computer system 300 for accessing information from the multiple sources in selective combination with internal proprietary data such as driver sensitive data, sales, costs, expense records, travel data, and the like from within a firewall 340. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The brake performance monitoring computer system 300 includes a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from the platoon self-ordering computer system 300, are exemplary forms of carrier waves transporting the information.

The brake performance monitoring computer system 300 can send messages and receive data, including program code, through the network(s), network link 320 and communication interface 318. In the Internet-connected example embodiment, the platoon initialization, redundant lane departure control, and redundant communication computer system 300 is operatively connected with a plurality of external public, private, governmental or commercial servers (not shown) as one or more wireless services 50, 60 configured to execute a web application in accordance with the example embodiment to be described below in greater detail. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data and executable code for performing the web application. The brake performance monitoring computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although the brake performance monitoring computer system 300 is shown in FIG. 3 as being connectable to a set of three (3) servers, 330, 332, and 334, those skilled in the art will recognize that the brake performance monitoring computer system 300 may establish connections to multiple additional servers on Internet 328. Each such server in the example embodiments includes HTTP-based Internet applications, which may provide information to the brake performance monitoring computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The brake performance monitoring computer system 300 suitably includes several subsystems or modules to perform the vehicle brake performance monitoring and management as set forth herein. A primary purpose of the subject application is to collect and provide information to vehicle control systems, vehicle operators, and/or fleet supervisors related to braking performance of the vehicle over time for use in system maintenance and platoon control and management for arranging two or more vehicles cooperatively travelling seriatim as a platoon along an associated roadway into a platoon arrangement, and to automatically control the gap distances therebetween, in accordance with their relative braking capabilities and other brake-related performance characteristics.

Figure 4A:
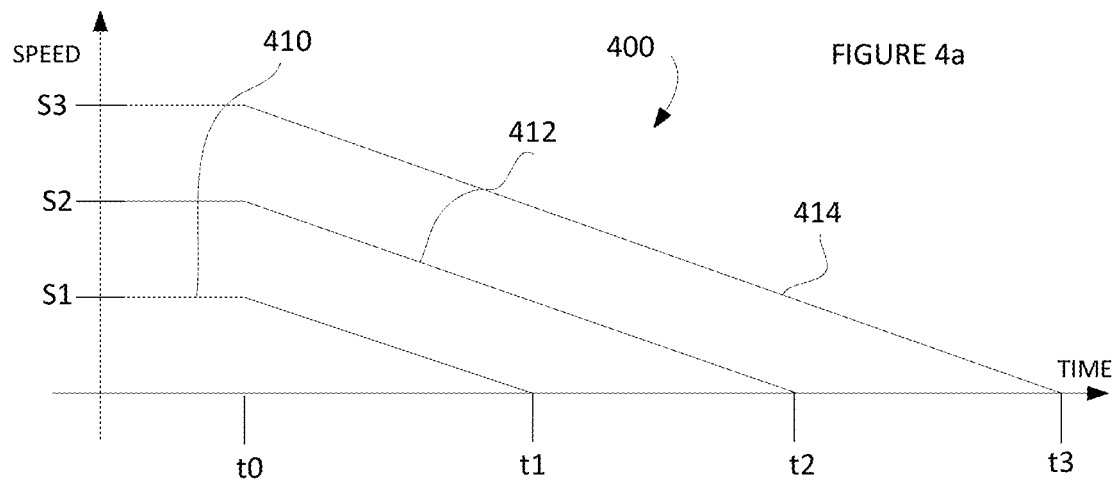
FIG. 4a is a schematic depiction of a graph showing vehicle stopping profiles in accordance with an example embodiment for the following vehicle of FIG. 1 initially travelling at various speeds and carrying a heavy load.
Figure 4B:
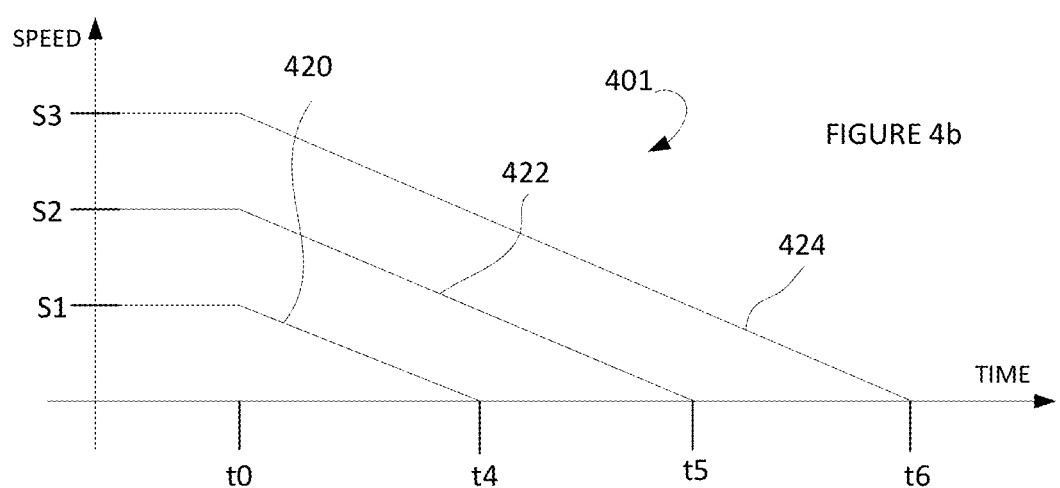
FIG. 4b is a schematic depiction of a graph showing vehicle stopping profiles in accordance with an example embodiment for the vehicle of FIG. 1 initially travelling at various speeds and carrying a medium load.
Figure 4C:
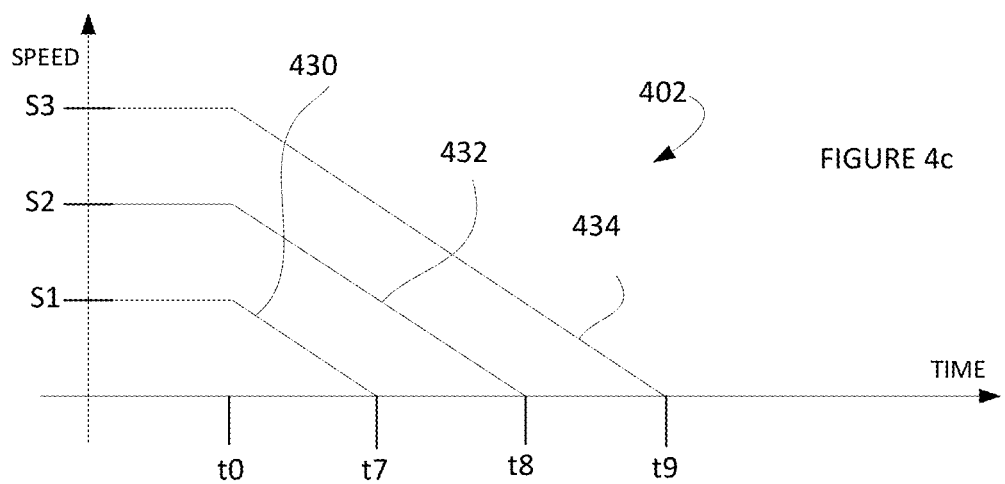
FIG. 4c is a is a schematic depiction of a graph showing vehicle stopping profiles in accordance with an example embodiment for the vehicle of FIG. 1 initially travelling at various speeds and carrying a light load.

FIGS. 4a-4c are schematic depictions of graphs showing vehicle stopping profiles in accordance with an example embodiment for the following vehicle of FIG. 1 initially travelling at various speeds and carrying a heavy load, a medium load, and a light load, respectively. The example embodiments provide rich and full information about brake system performance on a vehicle-by-vehicle basis. Knowing the deceleration capabilities of the vehicle may result in delayed system maintenance and lower maximum braking performance than may be expected by the operator. In this regard, the present example embodiment includes an algorithm adapted to have a real-time quantification of the wheel end brake system performance. In particular, the amount of time that passes between the vehicle control system receiving a deceleration command signal such as when for example an operator applies force to a brake pedal, and the desired deceleration of the vehicle being achieved is monitored during decelerations of the vehicle. This information together with information regarding the vehicle and axle loads during decelerations is entered or otherwise used as a data point defining the vehicle response delay. Similarly, knowing the axle loads and the ABS Activation of a wheel end for a given pressure such as determined by or from the brake pressure sensor 219 for example is used to create another data point. From all of these data points an overall performance of the brake system is developed in accordance with the vehicle brake performance monitoring of the example embodiment. This performance may define variables such as how long it takes the system to respond, how much deceleration the vehicle may be able to achieve for a given vehicle and axle loading, or the like. In addition, this information could then further be used to inform the operator that vehicle brake system maintenance is required or the order that a vehicle must be placed within a platoon. In accordance with an example embodiment, a first component of the response delay includes the amount of time that passes between the vehicle control system receiving the deceleration command signal such as from the operator applying force to the brake pedal, and the activation of the braking system of the vehicle, and a second component of the response delay includes the amount of time that passes between the activation of the braking system of the vehicle and the vehicle reaching or realizing the desired deceleration.

With the above in mind then, FIG. 4a is a schematic depiction of a graph showing vehicle stopping profiles 400 in accordance with an example embodiment for the following vehicle of FIG. 1 initially travelling at various speeds and carrying a heavy load. At a first vehicle speed S1 as sensed by the wheel speed sensor 216 or by other one or more sensors on the vehicle 20, brakes are applied at a first time t0, and the vehicle comes to a stop at a later time t1. The first vehicle stopping profile for the vehicle having a heavy load and initiating the deceleration at a low speed S1 is shown in the graph at 410. Similarly, at a second vehicle speed S2 as sensed by the wheel speed sensor 216 or by other one or more sensors on the vehicle 20, brakes are applied at the first time t0, and the vehicle comes to a stop at a later time t2. The second vehicle stopping profile for the vehicle having the heavy load and initiating the deceleration at a medium speed S2 is show in the graph at 412. Lastly for the light load, at a third vehicle speed S3 as sensed by the wheel speed sensor 216 or by other one or more sensors on the vehicle 20, brakes are applied at the first time t0, and the vehicle comes to a stop at a later time t3. The third vehicle stopping profile for the vehicle having the heavy load and initiating the deceleration at a high speed S3 is show in the graph at 414.

With the above in mind then, FIG. 4b is a schematic depiction of a graph showing vehicle stopping profiles 401 in accordance with an example embodiment for the following vehicle of FIG. 1 initially travelling at various speeds and carrying a medium load. At a first vehicle speed S1 as sensed by the wheel speed sensor 216 or by other one or more sensors on the vehicle 20, brakes are applied at a first time t0, and the vehicle comes to a stop at a later time t4. The first vehicle stopping profile for the vehicle having a medium load and initiating the deceleration at a low speed S1 is shown in the graph at 420. Similarly, at a second vehicle speed S2 as sensed by the wheel speed sensor 216 or by other one or more sensors on the vehicle 20, brakes are applied at the first time t0, and the vehicle comes to a stop at a later time t5. The second vehicle stopping profile for the vehicle having the medium load and initiating the deceleration at a medium speed S2 is shown in the graph at 422. Lastly for the medium load, at a third vehicle speed S3 as sensed by the wheel speed sensor 216 or by other one or more sensors on the vehicle 20, brakes are applied at the first time t0, and the vehicle comes to a stop at a later time t6. The third vehicle stopping profile for the vehicle having the medium load and initiating the deceleration at a high speed S3 is show in the graph at 424.

FIG. 4c is a is a schematic depiction of a graph showing vehicle stopping profiles in accordance with an example embodiment for the vehicle of FIG. 1 initially travelling at various speeds and carrying a light load. With reference now to that Figure, a schematic depiction of a graph showing vehicle stopping profiles 402 in accordance with an example embodiment is illustrated. At a first vehicle speed S1 as sensed by the wheel speed sensor 216 or by other one or more sensors on the vehicle 20, brakes are applied at a first time t0, and the vehicle comes to a stop at a later time t7. The first vehicle stopping profile for the vehicle having a light load and initiating the deceleration at a low speed S1 is shown in the graph at 430. Similarly, at a second vehicle speed S2 as sensed by the wheel speed sensor 216 or by other one or more sensors on the vehicle 20, brakes are applied at the first time t0, and the vehicle comes to a stop at a later time t8. The second vehicle stopping profile for the vehicle having the light load and initiating the deceleration at a medium speed S2 is shown in the graph at 432. Lastly for the light load, at a third vehicle speed S3 as sensed by the wheel speed sensor 216 or by other one or more sensors on the vehicle 20, brakes are applied at the first time t0, and the vehicle comes to a stop at a later time t9. The third vehicle stopping profile for the vehicle having the light load and initiating the deceleration at a high speed S3 is show in the graph at 434.

Figure 5:
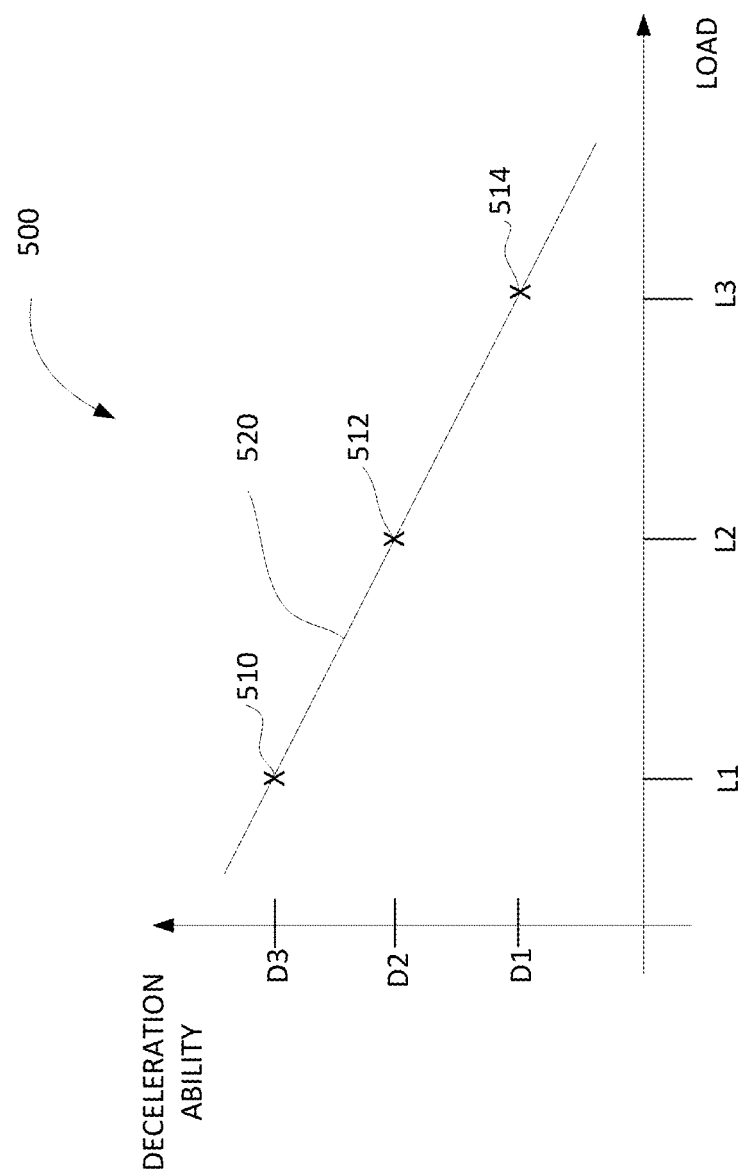
FIG. 5 is a schematic depiction of a graph showing a stopping ability profile in accordance with an example embodiment for the vehicle of FIG. 1 carrying various loads.

FIG. 5 is a schematic depiction of a graph 500 showing a stopping ability profile 520 in accordance with an example embodiment for the vehicle of FIG. 1 carrying various loads. As shown and in general, the deceleration ability of the vehicle 20 decreased with an increasing load. The slope of the stopping ability profile 520 is based the data collected in the vehicle stopping profiles 400, 401, 402 described above in connection with FIGS. 4a-4c. At a light load L1 the deceleration ability of the vehicle 20 is D3 as shown. At a medium load L2 the deceleration ability of the vehicle is determined to be D2. Lastly, at a heavy load L3 the stopping ability of the vehicle is determined to be 514. In the example embodiment, the data collected in the vehicle stopping profiles 400, 401, 402 described above in connection with FIGS. 4a-4c is accumulated for each stopping procedure performed by the vehicle, stored, analyzed by the processor of the platoon control unit 12. The collected data is assembled to form the vehicle stopping ability curve 520.

It is to be appreciated in connection with the example embodiment that the vehicle stopping ability curve 520 is relevant to only the vehicle from which the data is collected. It is further to be appreciated that the vehicle stopping ability curve 520 is dynamic. That is, as the vehicle 20 ages or as the brakes heat up or cool down the vehicle stopping profiles 400, 401, 402 described above in connection with FIGS. 4a-4c correspondingly change with these changing conditions. By this the vehicle stopping ability curve 520 is itself dynamic and changes with corresponding changes that occur in the vehicle stopping profiles.

Information about brake system performance is thereby provided or otherwise obtained in the example embodiment on a vehicle-by-vehicle basis. Knowing the deceleration capabilities of the vehicle may result in delayed system maintenance and lower maximum braking performance than may be expected by the operator. The example embodiment provides an algorithm to have a real-time quantification of the wheel end brake system performance (e.g., knowing the vehicle and axle loads, during decelerations the amount of time that passes between the vehicle control system receiving a deceleration command signal such as when for example an operator applies force to a brake pedal, and the desired deceleration of the vehicle being achieved could be monitored and entered as a data point defining the vehicle response delay). Similarly, knowing the axle loads and the ABS Activation of a wheel end for a given pressure such as determined by or from the brake pressure sensor 219 for example is used to create another data point. From all of these data points an overall performance of the brake system is developed. This performance may define variables such as how long it takes the system to respond, how much deceleration the vehicle may be able to achieve for a given vehicle and axle loading, or the like. This information could then be used as necessary and/or desired to inform the operator that vehicle brake system maintenance is required or the order that a vehicle must be placed within a platoon. In accordance with an example embodiment, a first component of the response delay includes the amount of time that passes between the vehicle control system receiving the deceleration command signal such as from the operator applying force to the brake pedal, and the activation of the braking system of the vehicle, and a second component of the response delay includes the amount of time that passes between the activation of the braking system of the vehicle and the vehicle reaching or realizing the desired deceleration.

Figure 6:
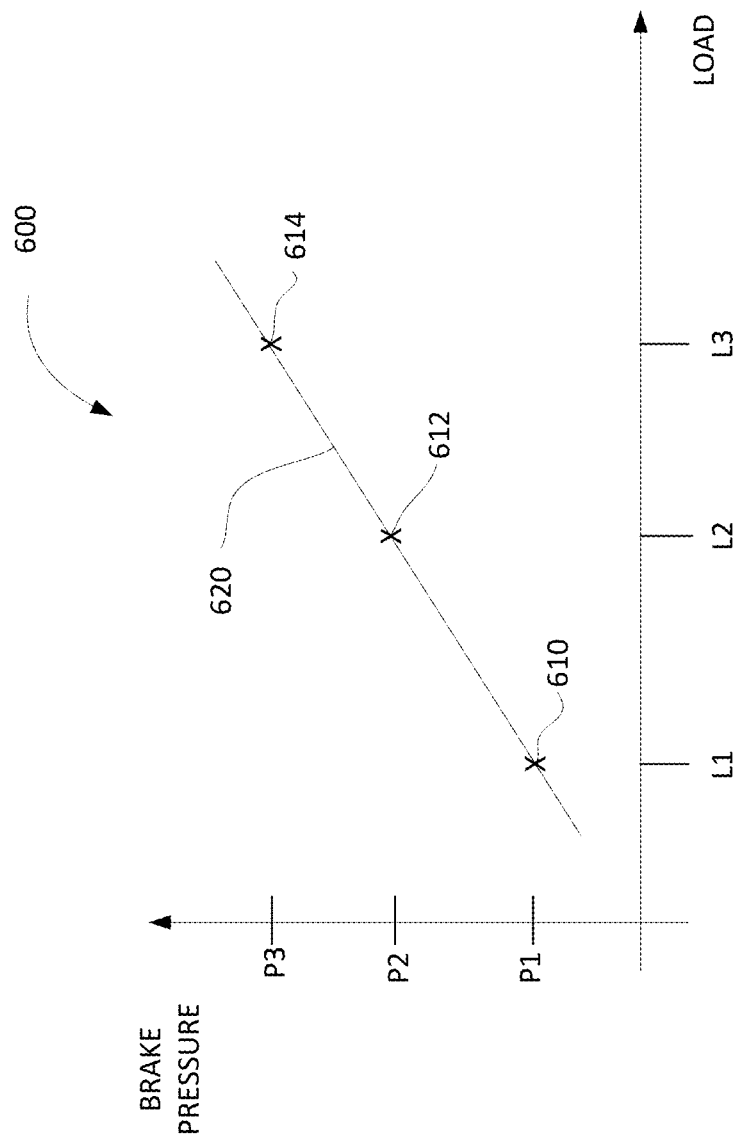
FIG. 6 is a schematic depiction of a graph showing an applied brake pressure profile in accordance with an example embodiment for the vehicle of FIG. 1 carrying various loads.

FIG. 6 is a schematic depiction of a graph showing an applied brake pressure profile in accordance with an example embodiment for the vehicle of FIG. 1 carrying various loads. As described above, knowing the axle loads and the ABS activation of a wheel end for a given pressure could be used to create another data point. From all of these data points an overall performance of the brake system could be developed. This performance may define variables such as how long it takes the system to respond, how much deceleration the vehicle may be able to achieve for a given vehicle and axle loading, or the like.

As shown and in general, the brake pressure required to be applied relative to the vehicle 20 increases with an increasing load. The slope of the applied brake pressure profile curve or function 620 is based on the data collected from one or more brake pressure switch(s) and based the data in the vehicle stopping profiles 400, 401, 402 described above in connection with FIGS. 4a-4c. At a light load L1 the brake pressure required to effect a desired stopping protocol of the vehicle 20 is P1 as shown. At a medium load L2 the brake pressure required to effect a desired stopping protocol of the vehicle 20 is P2 as shown. Lastly, at a heavy load L3 the brake pressure required to effect a desired stopping protocol of the vehicle 20 is P3 as shown. In the example embodiment, the data collected in the vehicle stopping profiles 400, 401, 402 described above in connection with FIGS. 4a-4c is accumulated for each stopping procedure performed by the vehicle, stored, and analyzed by the processor of the platoon control unit 12. The collected data is assembled to form the applied brake pressure profile curve or function 620.

It is to be appreciated in connection with the example embodiment that the applied brake pressure profile curve or function 620 is relevant to only the vehicle from which the data is collected. It is further to be appreciated that the applied brake pressure profile curve or function 620 is dynamic. That is, as the vehicle 20 ages or as the brakes heat up or cool down the vehicle stopping profiles 400, 401, 402 described above in connection with FIGS. 4a-4c correspondingly change with these changing conditions. By this the applied brake pressure profile curve or function 620 is itself dynamic and changes with corresponding changes that occur in the vehicle stopping profiles.

In accordance with an example embodiment, a system is provided for determining a braking capability of an associated following vehicle (20) of a set of platooning vehicles comprising the associated following vehicle and an associated leading vehicle (10) cooperatively travelling seriatim as a platoon (P) along an associated roadway. The system includes a platoon control unit 230, 300, a vehicle speed sensor 216, vehicle brake sensor 219, and a timer 241. The platoon control unit 200, 300 includes a processor 230, 304, a non-transient memory device 240, 306, 308, 310 operatively coupled with the processor, and logic 910 stored in the non-transient memory and executable by the processor to perform brake performance monitoring for vehicle platooning operation.

The vehicle speed sensor 216 is operable to sense a relative speed between the associated following vehicle (20) and the associated roadway, and generate relative speed data (Spd_Data) representative of the sensed relative speed between the associated following vehicle (20) and the associated roadway (1).

The vehicle brake sensor 219 is operable to sense activation of a braking system of the associated following vehicle (20). The timer is operable to determine timer interval data (INT) representative of a time difference between a first time (T1) and a second time (T2). Although a brake pressure sensor is illustrated in the example embodiment, other one or more sensor type(s) may be used as necessary and/or desired sense activation of the braking system of the associated vehicle.

The logic 910 of the platoon control unit is executable by the processor to determine at a first time (T1) an initiation (Brake_On) of the activation of the braking system in accordance with a first signal from the vehicle brake sensor, and to determine at a second time (T2) a cessation (Brake_Off) of the activation of the braking system in accordance with a second signal from the vehicle brake sensor. The logic is further executable by the processor to generate first braking quality data (QP_Data) in accordance with a predetermined combination of the relative speed data at the first time (Spd_Data_T1), the relative speed data at the second time (Spd_Data_T2), and the timer interval data (INT). In the example system embodiment described herein, the first braking quality data (QP_Data) is representative of a real-time quantification of brake system performance of the associated following vehicle (20).

Further in accordance with an example embodiment, a vehicle load sensor 220 is provided operatively coupled with the platoon control unit and being configured to be disposed in the associated following vehicle (20). The vehicle load sensor 220 is operable to sense a weight of a load being carried by the associated following vehicle (20), and generate load data (Load_Data) representative of the load being carried by the associated following vehicle (20). Based on this, the logic of the platoon control unit is executable by the processor to generate the first braking quality data (QP_Data) in accordance with a predetermined combination of the relative speed data at the first time (Spd_Data_T1), the relative speed data at the second time (Spd_Data_T2), the timer interval data (INT), and the load data (Load_Data).

Further in accordance with an example embodiment, a vehicle braking pressure sensor 219 is provided operatively coupled with the platoon control unit and being configured to be disposed in the associated following vehicle (20). The vehicle load sensor 220 is operable to sense a pressure of the braking system of the associated following vehicle (20) during the activation of the braking system, and generate pressure data (Pres_Data) representative of the sensed braking pressure. Based on this, the logic of the platoon control unit is executable by the processor to generate the first braking quality data (QP_Data) in accordance with a predetermined combination of the relative speed data at the first time (Spd_Data_T1), the relative speed data at the second time (Spd_Data_T2), the timer interval data (INT), and the pressure data (Pres_Data).

Further in accordance with an example embodiment, a vehicle antilock braking system (ABS) sensor 223 is provided operatively coupled with the platoon control unit and being configured to be disposed in the associated following vehicle (20). The vehicle ABS sensor 223 is operable to sense an activation of an ABS system of the associated following vehicle (20) during the activation of the braking system, and generate ABS data (ABS_Data) representative of the sensed ABS activation. Based on this, the logic of the platoon control unit is executable by the processor to generate the first braking quality data (QP_Data) in accordance with a predetermined combination of the relative speed data at the first time (Spd_Data_T1), the relative speed data at the second time (Spd_Data_T2), the timer interval data (INT), and the ABS data (ABS_Data).

Although in the example embodiment an ABS sensor 223 is described operable to sense an activation of an ABS system of the associated following vehicle (20) during the activation of the braking system, it is to be appreciated that ABS activation may be derived from the combination of sensors other than an ABS sensor. For example, ABS activation may be determined from the combination of input signals received vehicle wheel speed sensors (some wheels being locked/non-rotating and others being non-locked/rotating) or from a combination of inputs received from one or more wheel speed sensors with inputs received from one or more vehicle speed sensors such as GPS speed sensors, forward distance (to the next forward vehicle) sensor, relative road speed sensors, or the like.

Further in accordance with an example embodiment, a vehicle load sensor 220, a vehicle braking pressure sensor 219, and a vehicle antilock braking system (ABS) sensor 223 is provided operatively coupled with the platoon control unit and being configured to be disposed in the associated following vehicle (20). The vehicle load sensor 220 is operable to sense a weight of a load being carried by the associated following vehicle (20), and generate load data (Load_Data) representative of the load being carried by the associated following vehicle (20). The vehicle load sensor 220 is operable to sense a pressure of the braking system of the associated following vehicle (20) during the activation of the braking system, and generate pressure data (Pres_Data) representative of the sensed braking pressure. The vehicle load sensor 220 is operable to sense an activation of an ABS system of the associated following vehicle (20) during the activation of the braking system, and generate ABS data (ABS_Data) representative of the sensed ABS activation. Based on this, the logic of the platoon control unit is executable by the processor to generate the first braking quality data (QP_Data) in accordance with a predetermined combination of the relative speed data at the first time (Spd_Data_T1), the relative speed data at the second time (Spd_Data_T2), the timer interval data (INT), the load data (Load_Data), and the pressure data (Pres_Data), and the ABS data (ABS_Data).

A communication transmitter is provided operatively coupled with the platoon control unit. The communication transmitter is operable to convert the first braking quality data (QP_Data) into a first braking quality data signal (QP_Data_Sig), and transmit the first braking quality data signal (QP_Data_Sig) from the associated following vehicle (20) to the associated leading vehicle (10) for use by the associated leading vehicle to make a platoon ordering control decision relative to the following vehicle (20).

A communication receiver is further provided operatively coupled with the platoon control unit. The communication transmitter is operable to receive a second braking quality data signal (2nd_QP_Data) from the associated leading vehicle (10), the second braking quality data signal (2nd_QP_Data) being representative of a real-time quantification of brake system performance of the associated leading vehicle (10), and convert the second braking quality data (2nd_QP_Data) into a second braking quality data signal (2nd_QP_Data_Sig). The communication transmitter is further operable to communicate the second braking quality data signal (2nd_QP_Data_Sig) to the platoon control unit for processing by the logic for making a platoon ordering control decision relative to the leading vehicle (10).

In the example embodiment, the second vehicle 20 follows behind a leader vehicle 10 travelling in a lane on an associated roadway 10 along a forward path in a first forward direction by a following or longitudinal gap distance. FIG. 1 illustrates a basic platoon P including a host or leader vehicle 10 and a second vehicle 20 in accordance with the present disclosure. As shown, the follower vehicle 20 is traveling proximate to the leader vehicle 10 seriatim in an ordered platoon P along the roadway 1. The leader vehicle 10 is provided with an electronic control system 12 of the type described above which includes a data collection and communication module portion of the type described above and a brake monitoring and platooning control portion also of the type described above. Similarly, the follower vehicle 20 is also provided with an electronic control system 12' which also includes data collection and communication module portions and brake monitoring and platooning control portions. In the example embodiments to be described herein, each of the two or more vehicles comprising the various platoons that will be described include the same or equivalent electronic control system 12, the same or equivalent data collection and communication module portion 200, and the same or equivalent brake monitoring and platooning control portion 300, although other control systems having the functionality to be described herein may equivalently be used as necessary or desired.

In FIG. 1, each of the platooning vehicles 10, 20 includes a communication receiver operatively coupled with the platoon control unit. Relative to the following vehicle 20, the communication receiver is operable to receive a second braking quality data signal (2nd_QP_Data_Sig) from the associated leading vehicle 10. In the example embodiment, the second braking quality data signal (2nd_QP_Data_Sig) comprises data related t the monitored brake of the leading vehicle and is selectively usable by the associated following vehicle 20 to determine an appropriate following distance. In addition, each of the platooning vehicles 10, 20 includes a vehicle speed sensor 216 and a forward distance sensor operatively coupled with their respective platoon control units 12, 12'. The vehicle speed sensors 216 operate to sense a relative speed between the vehicles and the associated roadway 1.

As further noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

Further in accordance with an example embodiment, the logic of the platoon control unit is executable by the processor to generate, in accordance with the second braking quality data signal (2nd_QP_Data), a following distance command signal (Follow_Dist) representative of a following distance to be maintained by the associated following vehicle relative to the associated leading vehicle (10).

The example embodiment provides an algorithm or other logic or process steps to have a real-time quantification of the wheel end brake system performance (e.g., knowing the vehicle and axle loads, during decelerations the amount of time that passes between the vehicle control system receiving a deceleration command signal such as when for example an operator applies force to a brake pedal, and the desired deceleration of the vehicle being achieved could be monitored and entered as a data point defining the vehicle response delay). Similarly, knowing the axle loads and the ABS Activation of a wheel end for a given pressure could be used to create another data point. From all of these data points an overall performance of the brake system could be developed. This performance may define variables such as how long it takes the system to respond, how much deceleration the vehicle may be able to achieve for a given vehicle and axle loading, etc. In accordance with an example embodiment, a first component of the response delay includes the amount of time that passes between the vehicle control system receiving the deceleration command signal such as from the operator applying force to the brake pedal, and the activation of the braking system of the vehicle, and a second component of the response delay includes the amount of time that passes between the activation of the braking system of the vehicle and the vehicle reaching or realizing the desired deceleration.

In the above regard, the vehicle speed sensor 216 is operable to sense relative speeds between the associated following vehicle (20) and the associated roadway, and generate plural relative speed data (PL_Spd_Data) representative of the sensed relative speeds between the associated following vehicle (20) and the associated roadway (1).

The vehicle brake sensor is operable to sense activations of a braking system of the associated following vehicle (20). The timer is operable to determine plural timer interval data (PL_INT) representative of time differences between the activations of a braking system.

The vehicle load sensor 220 is operable to sense weights of a plurality loads being carried by the associated following vehicle (20), and generate plural load data (PL_Load_Data) representative of the plurality of loads being carried by the associated following vehicle (20).

The vehicle braking pressure sensor 219 is operable to sense pressures of the braking system of the associated following vehicle (20) during plural activations of the braking system, and generate plural pressure data (PL_Pres_Data) representative of the sensed braking pressures.

The vehicle antilock braking system (ABS) sensor 223 is operable to sense activations of an ABS system of the associated following vehicle (20) during the plural activations of the braking system, and generate plural ABS data (PL_ABS_Data) representative of the sensed ABS activations.

Based on this, the logic of the platoon control unit is executable by the processor to generate the first braking quality data (QP_Data) in accordance with a predetermined combination of the plural relative speed data (PL_Spd_Data), the plural timer interval data (PL_INT), the plural load data (PL_Load_Data), the plural pressure data (PL_Pres_Data), and the plural ABS data (PL_ABS_Data).

Figure 7:
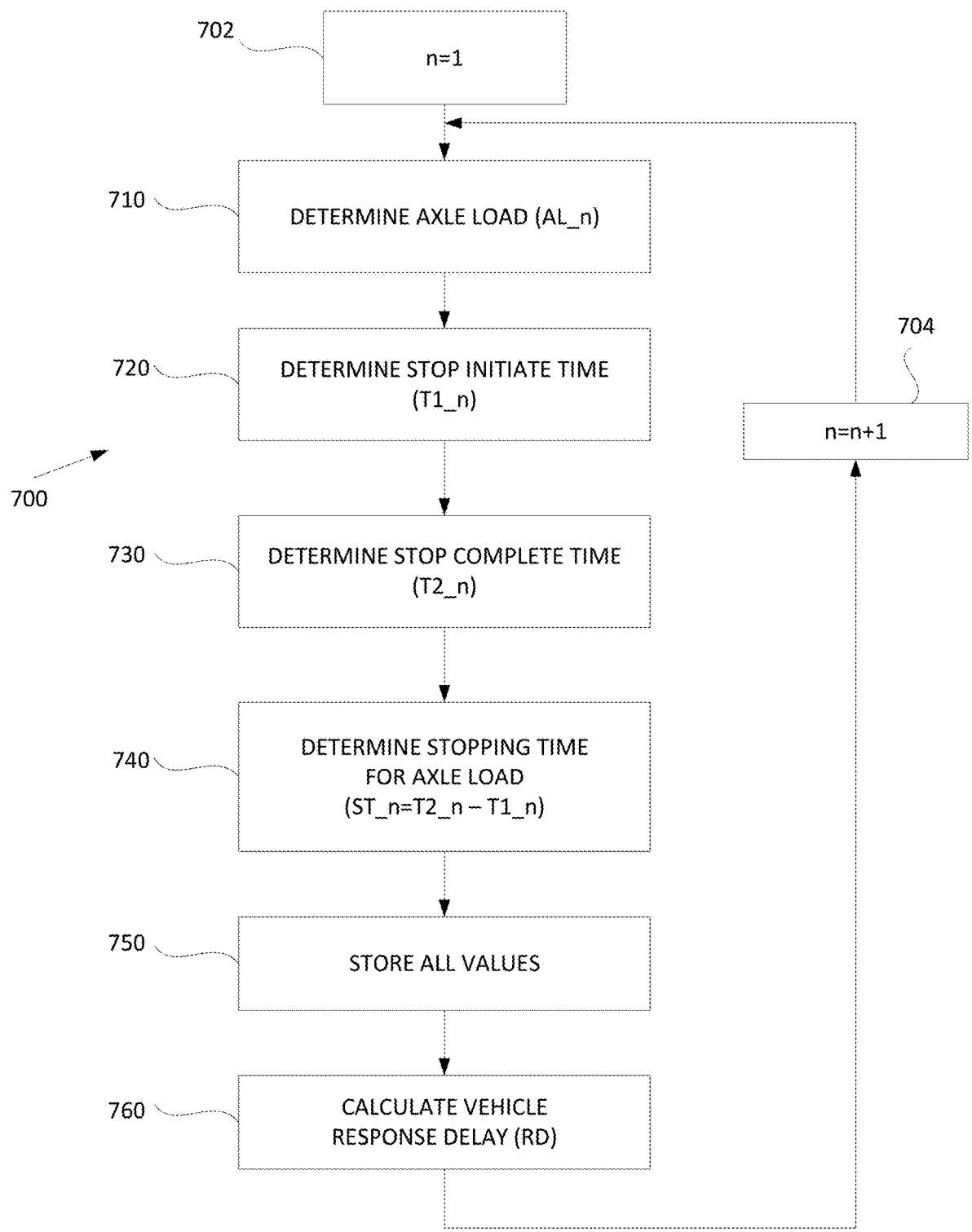
FIG. 7 is a flow diagram showing a method of monitoring a vehicle response delay parameter of the vehicle of FIG. 1 over time in accordance with an example embodiment.

FIG. 7 is a flow diagram showing a method 700 of monitoring a response delay parameter of the vehicle 20 of FIG. 1 over time in accordance with an example embodiment. As noted above, the electronic control system 12 is provided for communication and control functions. Logic such as software or other forms are executed by the processor of the control system 12 in order to conduct communication functionality, vehicle and driver parameter manipulation, and platoon management including, in the example embodiment, brake performance monitoring for vehicle platooning operation. Although the portions of the methods and sub-methods to be described herein are illustrated as functioning serially, it is to be appreciated that the particular serial arrangement is for ease of illustration purposes only, and that the embodiments herein are not limited to the exact serial execution, and may be executed in any particular order or in any combination order or in parallel by the control system or an equivalent control system as may be necessary or desired.

In one example, executable instructions associated with performing a method may be embodied as a logic encoded in one or more tangible media for execution. When executed, the instructions may perform a method. Thus, in one example, a logic encoded in one or more tangible media may store computer executable instructions that if executed by a machine (e.g., processor) cause the machine to perform the methods and sub-methods described herein. While executable instructions associated with the above method are described as being embodied as a logic encoded in one or more tangible media, it is to be appreciated that executable instructions associated with other example methods described herein may also be stored on a tangible media.

With continued reference to the method 700 of FIG. 7, overall and in general, for each deceleration process that is executed by the operator of the vehicle, the system of the example embodiment determines by performing a single loop of the method 700 as a first set of parameters: the vehicle load, the time that is required to decelerate for the load, the brake pressure required to decelerate the vehicle within the time for the given load, and the vehicle response delay RD. In accordance with an example embodiment, a first component of the response delay includes the amount of time that passes between the vehicle control system receiving the deceleration command signal such as from the operator applying force to the brake pedal, and the activation of the braking system of the vehicle, and a second component of the response delay includes the amount of time that passes between the activation of the braking system of the vehicle and the vehicle reaching or realizing the desired deceleration.

With this in mind, a loop parameter n is initialize at step 702 as n=1. The Axle load AL_n for the first loop of the method is determined at step 710 such as by reading data from one or more axle load sensors 220 provided on the vehicle and being operatively coupled with the control unit 12". The time at which the stop is initiated T1_$n$ is determined at step 720 and the time at which the stop is completed is T2_$n$ determined at step 730.

In step 740 the method 700 of monitoring the response delay parameter of the vehicle 20 determines the overall deceleration time for the determined axle load AL_n as ST_n=T2_$n$-T1_$n$. The values are stored at step 750 in the memory device 240, the values including the determined axle load AL_n, the time at which the deceleration is initiated T1_$n$, the time at which the deceleration is completed is T2_$n$, and the overall deceleration time ST_n for the determined axle load AL_n.

The braking quality and performance metric logic 910 of the example embodiment provides a real-time quantification of the wheel end brake system performance (e.g., knowing the vehicle and axle loads, during decelerations the amount of time that passes between the vehicle control system receiving a deceleration command signal such as when for example an operator applies force to a brake pedal, and the desired deceleration of the vehicle being achieved could be monitored FIGS. 4a-4c and entered as a data point defining the vehicle response delay FIG. 5). Similarly, knowing the axle loads (FIGS. 7 & 8) and the ABS Activation (FIG. 8) of a wheel end for a given pressure FIG. 6 could be used to create another data point. From all of these data points an overall performance of the brake system could be developed. This performance may define variables such as how long it takes the system to respond, how much deceleration the vehicle may be able to achieve for a given vehicle and axle loading, etc. This overall braking quality and performance metric 922 information could then be used to inform the operator that vehicle brake system maintenance is required or the order that a vehicle must be placed within a platoon. In accordance with an example embodiment, a first component of the response delay includes the amount of time that passes between the vehicle control system receiving the deceleration command signal such as from the operator applying force to the brake pedal, and the activation of the braking system of the vehicle, and a second component of the response delay includes the amount of time that passes between the activation of the braking system of the vehicle and the vehicle reaching or realizing the desired deceleration.

Figure 8:
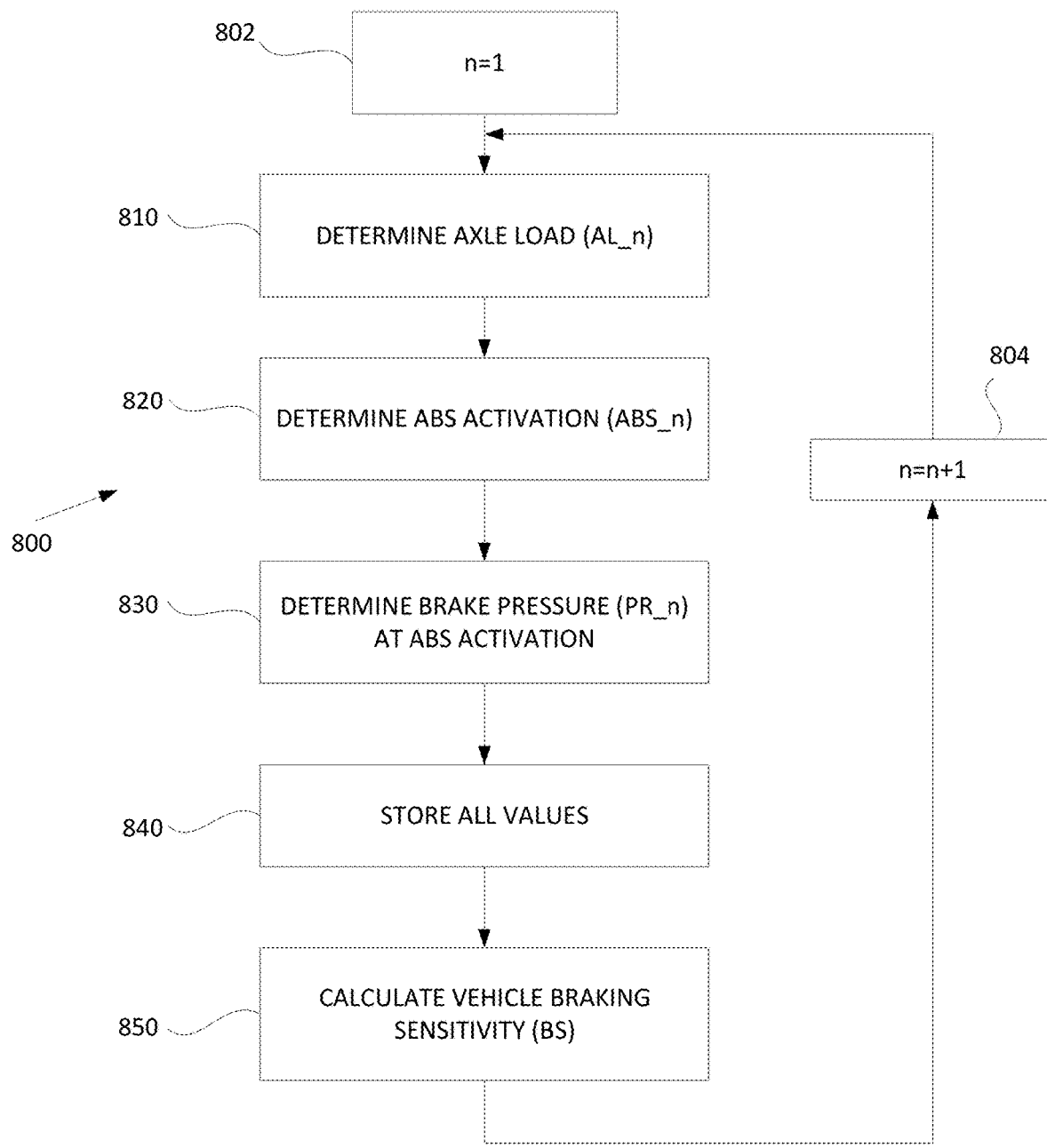
FIG. 8 is a flow diagram showing a method of monitoring a braking sensitivity parameter of the vehicle of FIG. 1 over time in accordance with an example embodiment.

FIG. 8 is a flow diagram showing a method of monitoring a braking sensitivity parameter of the vehicle of FIG. 1 over time in accordance with an example embodiment. Overall and in general, for each deceleration process that is executed by the operator of the vehicle, the system of the example embodiment determines by performing a single loop of the method 800: the vehicle load, the activation of any onboard ABS systems of the vehicle, and a brake pressure for performing the deceleration that is required to perform the stop for the load With this in mind, a loop parameter n is initialize at step 802 as n=1. The Axle load AL_n for the first loop of the method 800 is determined at step 810 such as by reading data from one or more axle load sensors 220 provided on the vehicle and being operatively coupled with the control unit 12". The determination of any ABS activation ABS_n is determined at step 820 and the brake pressure PR_n at ABS activation is determined at step 830.

In step 840 the method 800 stores the values in the memory device 240. Lastly, the vehicle braking sensitivity BS parameter is calculated in step 850 based on the determined axle load AL_n, the determined ABS activation ABS_n, and the determined brake pressure PR_n.

Figure 9:
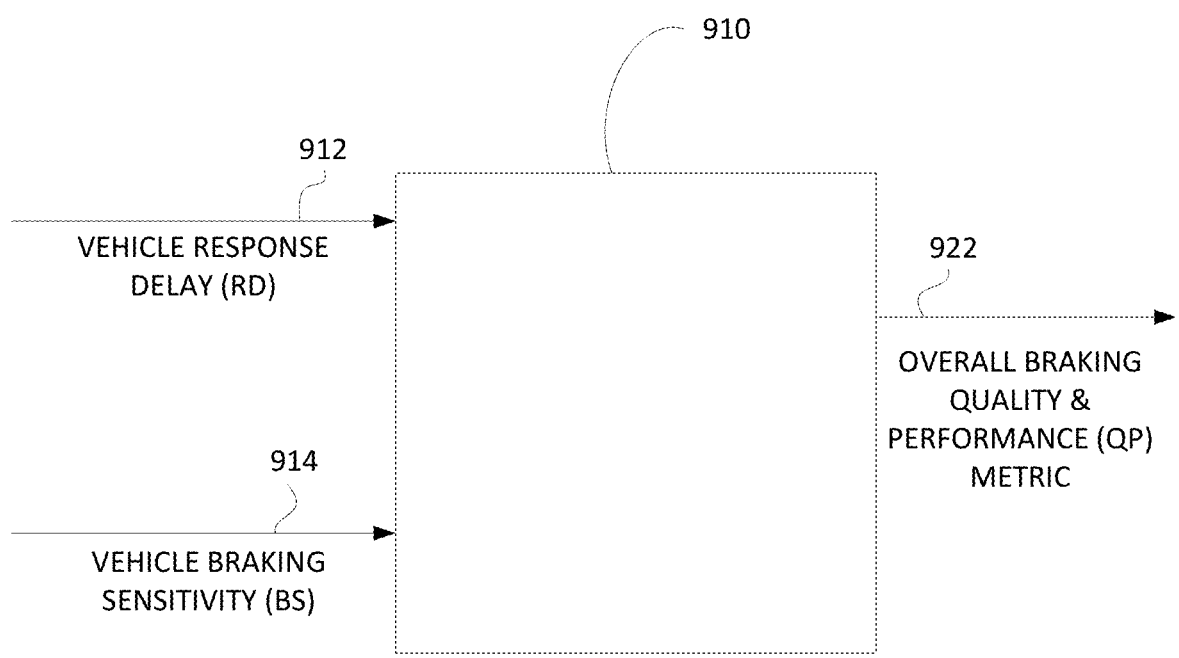
FIG. 9 is a functional block diagram view of logic for determining an overall braking quality and performance metric of the following vehicle of FIG. 1 using the response delay and braking sensitivity parameters of FIGS. 7 and 8 for brake performance monitoring in accordance with an example embodiment.

FIG. 9 is a functional block diagram view of logic 910 for determining an overall braking quality and performance metric 922 of the following vehicle of FIG. 1 using the response delay parameter 912 of FIG. 7 and the braking sensitivity parameter 914 of FIG. 8 for brake performance monitoring in accordance with an example embodiment. The braking quality and performance metric logic 910 of the example embodiment provides real-time quantification of the wheel end brake system performance. Information about brake system performance on a vehicle by vehicle basis is provided. Knowing the deceleration capabilities of the vehicle beneficially result in delayed system maintenance and lower maximum braking performance than may be expected by the operator.

Lastly, the vehicle response delay RD is calculated in step 760 based on the determined axle load AL_n, the time at which the deceleration is initiated T1_$n$, the time at which the deceleration is completed is T2_$n$, and the overall deceleration time ST_n. For the next deceleration process that is executed by the operator of the vehicle, the system of the example embodiment increments the loop counter at step 704 as n=n+1, and determines by performing a further single loop of the method 700 as a second set of parameters: the vehicle load, the time that is required for the desired deceleration of the load, the brake pressure required to decelerate the vehicle within the time for the given load, and the vehicle response delay RD.

A method for determining a braking capability of an associated following vehicle (20) of a set of platooning vehicles comprising the associated following vehicle and an associated leading vehicle (10) cooperatively travelling as a platoon (P) along an associated roadway includes providing a platoon control unit of the type shown in FIGS. 2 and 3 configured to be disposed in the associated following vehicle (20). The platoon control unit comprises a processor 304, a non-transient memory device 240 operatively coupled with the processor, and logic 308, 310 including the braking quality and performance metric logic 910 stored in the non-transient memory and executable by the processor to perform brake performance monitoring for vehicle platooning operation.

Using a vehicle speed sensor 216 operatively coupled with the platoon control unit and configured to be disposed in the associated following vehicle (20), a relative speed between the associated following vehicle (20) and the associated roadway is sensed, and relative speed data (Spd_Data) is generated representative of the sensed relative speed between the associated following vehicle (20) and the associated roadway (1).

Using a vehicle brake sensor operatively coupled with the platoon control unit and configured to be disposed in the associated following vehicle (20), activation of a braking system of the associated following vehicle (20) is sensed. Using a timer operatively coupled with the platoon control unit and configured to be disposed in the associated following vehicle (20), timer interval data (INT) representative of a time difference between a first time (T1) and a second time (T2) is determined and the logic of the platoon control unit is executed by the processor to determine at a first time (T1) an initiation (Brake_On) of the activation of the braking system in accordance with a first signal from the vehicle brake sensor, determine at a second time (T2) a cessation (Brake_Off) of the activation of the braking system in accordance with a second signal from the vehicle brake sensor, and generate first braking quality data (QP_Data) in accordance with a predetermined combination of the relative speed data at the first time (Spd_Data_T1), the relative speed data at the second time (Spd_Data_T2), and the timer interval data (INT), the first braking quality data (QP_Data) being representative of a real-time quantification of brake system performance of the associated following vehicle (20).

In addition, using a vehicle load sensor 220 operatively coupled with the platoon control unit and configured to be disposed in the associated following vehicle (20), a weight of a load being carried by the associated following vehicle (20) is determined, and load data (Load_Data) is generated representative of the load being carried by the associated following vehicle (20).

Using a vehicle braking pressure sensor 219 operatively coupled with the platoon control unit and configured to be disposed in the associated following vehicle (20), a pressure of the braking system of the associated following vehicle (20) is sensed during the activation of the braking system, and pressure data (Pres_Data) is generated representative of the sensed braking pressure.

Using a vehicle antilock braking system (ABS) sensor 223 operatively coupled with the platoon control unit and configured to be disposed in the associated following vehicle (20), an activation of an ABS system of the associated following vehicle (20) during the activation of the braking system is sensed, and ABS data (ABS_Data) is generated representative of the sensed ABS activation.

The logic of the platoon control unit is executed by the processor to generate the first braking quality data (QP_Data) in accordance with a predetermined combination of the relative speed data at the first time (Spd_Data_T1), the relative speed data at the second time (Spd_Data_T2), the timer interval data (INT), the load data (Load_Data), and the pressure data (Pres_Data), and the ABS data (ABS_Data).

The subject system of the example embodiment selectively uses statistical methods and techniques, and historical brake event monitoring. In this regard, the vehicle speed sensor 216 is operated to sense relative speeds between the associated following vehicle (20) and the associated roadway, and to generate plural relative speed data (PL_Spd_Data) representative of the sensed relative speeds between the associated following vehicle (20) and the associated roadway (1). The vehicle brake sensor is monitored to sense activations of a braking system of the associated following vehicle (20). The timer is operated to determine plural timer interval data (PL_INT) representative of time differences between the activations of a braking system. The vehicle load sensor 220 is operated to sense weights of a plurality loads being carried by the associated following vehicle (20), and generate plural load data (PL_Load_Data) representative of the plurality of loads being carried by the associated following vehicle (20). The vehicle braking pressure sensor 219 is operated to sense pressures of the braking system of the associated following vehicle (20) during plural activations of the braking system, and generate plural pressure data (PL_Pres_Data) representative of the sensed braking pressures. The vehicle antilock braking system (ABS) sensor 223 is operated to sense activations of an ABS system of the associated following vehicle (20) during the plural activations of the braking system, and generate plural ABS data (PL_ABS_Data) representative of the sensed ABS activations. The logic of the platoon control unit is executed by the processor to generate the first braking quality data (QP_Data) in accordance with a predetermined combination of the plural relative speed data (PL_Spd_Data), the plural timer interval data (PL_INT), the plural load data (PL_Load_Data), the plural pressure data (PL_Pres_Data), and the plural ABS data (PL_ABS_Data).

The leading vehicle 10 may be informed of the monitored brake condition of the following vehicle 20 in accordance with an example embodiment. In this regard, a communication transmitter coupled with the platoon control unit is operated to convert the first braking quality data (QP_Data) into a first braking quality data signal (QP_Data_Sig), and transmit the first braking quality data signal (QP_Data_Sig) from the associated following vehicle (20) to the associated leading vehicle (10) for use by the associated leading vehicle to make a platoon ordering control decision relative to the following vehicle (20).

The following vehicle 20 may be informed of the monitored brake condition of the leading vehicle 10 in accordance with an example embodiment. In this regard, a communication receiver coupled with the platoon control unit is operated to receive a second braking quality data signal (2nd_QP_Data) from the associated leading vehicle (10), the second braking quality data signal (2nd_QP_Data) being representative of a real-time quantification of brake system performance of the associated leading vehicle (10). The second braking quality data (2nd_QP_Data) is converted into a second braking quality data signal (2nd_QP_Data_Sig), and is communicated the second braking quality data signal (2nd_QP_Data_Sig) to the platoon control unit for processing by the logic for making a platoon ordering control decision relative to the leading vehicle (10).

The following vehicle 20 may regulate its following distance relative to the leading vehicle 10 based on the brake conditions of the leading vehicle as monitored by the leading vehicle using techniques described herein. In this regard the logic of the platoon control unit is executed by the processor to generate, in accordance with the second braking quality data signal (2nd_QP_Data) from the leading vehicle, a following distance command signal (Follow_Dist) representative of a following distance to be maintained by the associated following vehicle relative to the associated leading vehicle (10).

Figure 10:
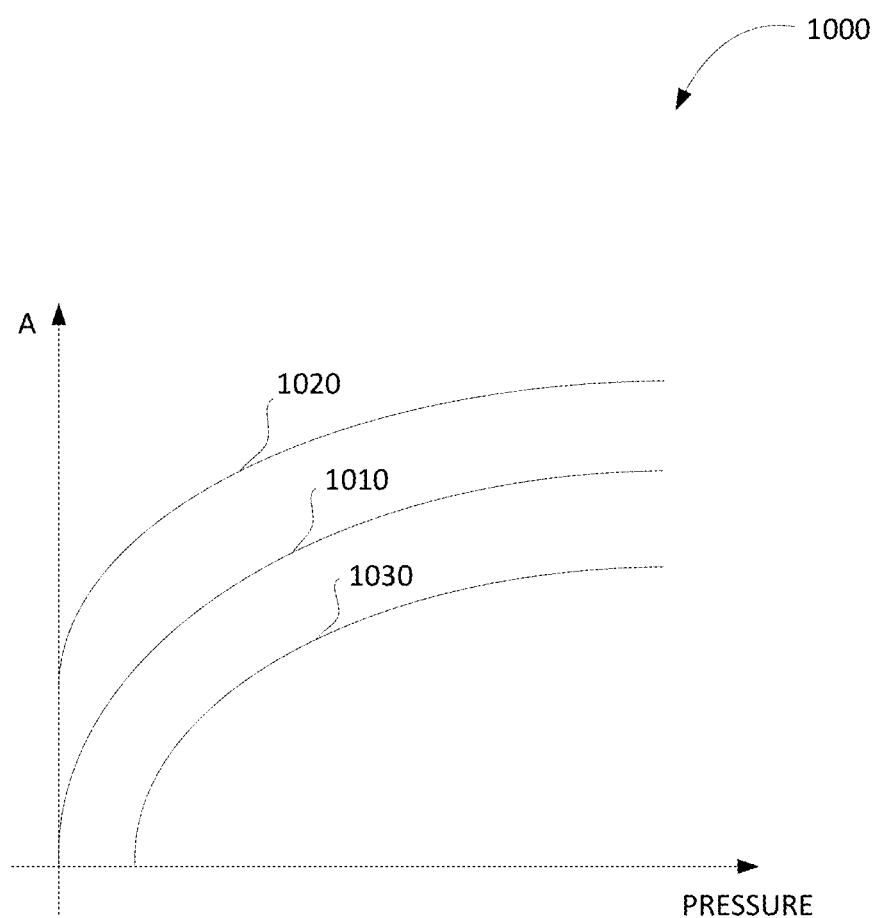
FIG. 10 is a graph showing operation zones for permitting platoon participation by the following vehicle of FIG. 1 based on the braking quality and performance metric resulting from the brake performance monitoring in accordance with an example embodiment.

FIG. 10 is a graph 1000 showing operation zones for permitting platoon participation by the following vehicle of FIG. 1 based on the braking quality and performance metric resulting from the brake performance monitoring in accordance with an example embodiment. The graph 1000 shown a set of three (3) deceleration versus braking pressure curves 1010, 1020, and 1030 wherein the middle deceleration versus braking pressure curve 1010 is representative in the example embodiment of a known good braking system. That is, the middle deceleration versus braking pressure curve 1010 is representative in the example embodiment of the overall braking quality and performance metric 922 of the vehicle 20 when it was operable under known good braking conditions.

Over time, however, the braking system may become worn or the environmental conditions may change such as the weather becoming hot. These factors may adversely influence the braking quality and performance metric resulting from the brake performance monitoring in accordance with an example embodiment to migrate towards the upper deceleration versus braking pressure curve 1020 which is representative of an upper boundary of a safe operating condition for the vehicle.

Conversely, the environmental conditions may change such as the weather becoming cool or dry. These factors may positively influence the braking quality and performance metric resulting from the brake performance monitoring in accordance with an example embodiment to migrate towards the lower deceleration versus braking pressure curve 1030 which is representative of an upper boundary setting a safe condition for operating the vehicle in a platoon such as shown for example in FIG. 1.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A vehicle control system comprising:
a platoon control unit configured to be disposed in an associated following vehicle of a set of platooning vehicles comprising the associated following vehicle and an associated leading vehicle cooperatively travelling as a platoon along an associated roadway, the platoon control unit comprising:
a processor;
a non-transient memory device operatively coupled with the processor; and
logic stored in the non-transient memory and executable by the processor to determine a dynamic braking capability of the associated following vehicle;
a vehicle speed sensor operatively coupled with the platoon control unit and being configured to be disposed in the associated following vehicle, the vehicle speed sensor being operable to:
sense a speed of the associated following vehicle; and
generate speed data representative of the sensed speed of the associated following vehicle;
a vehicle brake pressure sensor operatively coupled with the platoon control unit and being configured to be disposed in the associated following vehicle, the vehicle brake sensor being operable to:
sense brake activation pressure of a braking system of the associated following vehicle; and
generate brake pressure data representative of the sensed brake activation pressure of the associated following vehicle;
a timer operatively coupled with the platoon control unit and being configured to be disposed in the associated following vehicle, the timer being operable to:
generate timer interval data representative of a time difference between an initiation time of a selected braking event and a termination time of the selected braking event,
wherein the logic of the platoon control unit is executable by the processor to:
determine a first vehicle braking sensitivity during a first deceleration of the associated following vehicle that commences at the platoon control unit receiving a first deceleration command signal representative of a first desired deceleration based on:
a first initial speed of the associated following vehicle at a first initiation time of the first deceleration determined based on the speed data generated by the vehicle speed sensor at the first initiation time of the first deceleration;
a first brake activation pressure of the braking system of the associated following vehicle determined based on the brake pressure data generated by the vehicle brake pressure sensor during the first deceleration;
a first termination speed of the associated following vehicle at a first termination time of the first deceleration determined based on the speed data generated by the vehicle speed sensor at the first termination time of the first deceleration; and
a first deceleration time interval determined based on a first time difference between the first initiation time and the first termination time of the first deceleration based on first timer interval data generated by the timer representative of a time difference between the first initiation and termination times of the first deceleration;
determine a first vehicle response delay during the first deceleration based on the first deceleration time interval, wherein the first vehicle response delay comprises: a first component comprising an amount of time during the first deceleration that passes between the platoon control unit receiving the first deceleration command signal and activation of the braking system of the associated following vehicle; and a second component comprising an amount of time that passes during the first deceleration between the activation of the braking system and the associated following vehicle reaching the first desired deceleration;
determine a second vehicle braking sensitivity during a second deceleration of the associated following vehicle that commences at the platoon control unit receiving a second deceleration command signal representative of a second desired deceleration based on:
a second initial speed of the associated following vehicle at a second initiation time of the second deceleration determined based on the speed data generated by the vehicle speed sensor at the second initiation time of the second deceleration;

a second brake activation pressure of the braking system of the associated following vehicle determined based on the brake pressure data generated by the vehicle brake pressure sensor during the second deceleration;

a second termination speed of the associated following vehicle at a second termination time of the second deceleration determined based on the speed data generated by the vehicle speed sensor at the second termination time of the second deceleration; and a second deceleration time interval determined based on a second time difference between the second initiation time and the second termination time of the second deceleration based on second timer interval data generated by the timer representative of a time difference between the second initiation and termination times of the second deceleration;

determine a second vehicle response delay during the second deceleration based on the second deceleration time interval, wherein the second vehicle response delay comprises: a first component comprising an amount of time during the second deceleration that passes between the platoon control unit receiving the second deceleration command signal and activation of the braking system of the associated following vehicle; and a second component comprising an amount of time that passes during the second deceleration between the activation of the braking system and the associated following vehicle reaching the second desired deceleration;

generate first braking quality data in accordance with a predetermined combination of the first and second vehicle response delays and the first and second vehicle braking sensitivities, the first braking quality data being representative of the dynamic braking capability of the associated following vehicle.

2. The vehicle control system according to claim 1, further comprising:

a vehicle load sensor operatively coupled with the platoon control unit and being configured to be disposed in the associated following vehicle, the vehicle load sensor being operable to:

sense a weight of a load being carried by the associated following vehicle; and generate load data representative of the load being carried by the associated following vehicle.

3. The vehicle control system according to claim 2, wherein the logic of the platoon control unit is executable by the processor to:

generate the first braking quality data in accordance with a predetermined combination of the first and second vehicle response delays and the first and second vehicle braking sensitivities, and the load data.

4. The vehicle control system according to claim 1, wherein:

the vehicle speed sensor is operable to:

sense a relative speed between the associated following vehicle and the associated roadway; and generate the speed data representative of the sensed relative speed.

5. The vehicle control system according to claim 1, wherein the logic of the platoon control unit is executable by the processor to:

determine that the associated following vehicle is permitted to participate in the platoon based on the first braking quality data being within a predetermined operation zone.

6. The vehicle control system according to claim 1, further comprising:

a vehicle antilock braking system sensor operatively coupled with the platoon control unit and being configured to be disposed in the associated following vehicle, the vehicle antilock braking system sensor being operable to:

sense an activation of an ABS system of the associated following vehicle during the activation of the braking system; and generate ABS data representative of the sensed ABS activation.

7. The vehicle control system according to claim 6, wherein the logic of the platoon control unit is executable by the processor to:

generate the first braking quality data in accordance with a predetermined combination of the first and second vehicle response delays and the first and second vehicle braking sensitivities, and the ABS data.

8. The vehicle control system according to claim 1, further comprising:

a vehicle load sensor operatively coupled with the platoon control unit and being configured to be disposed in the associated following vehicle, the vehicle load sensor being operable to:

sense a weight of a load being carried by the associated following vehicle; and generate load data representative of the load being carried by the associated following vehicle; and a vehicle antilock braking system (ABS) sensor operatively coupled with the platoon control unit and being configured to be disposed in the associated following vehicle, the vehicle antilock braking system sensor being operable to:

sense an activation of an ABS system of the associated following vehicle during the activation of the braking system; and generate ABS data representative of the sensed ABS activation.

9. The vehicle control system according to claim 8, wherein the logic of the platoon control unit is executable by the processor to:

generate the first braking quality data in accordance with a predetermined combination of the first and second vehicle response delays and the first and second vehicle braking sensitivities, the load data, and the ABS data.

10. The vehicle control system according to claim 8, wherein:

the vehicle speed sensor is operable to:

generate plural relative speed data representative of sensed speeds of the associated following vehicle;

the vehicle brake pressure sensor is operable to:

sense activations of a braking system of the associated following vehicle;

the timer is operable to:

determine plural timer interval data representative of time differences between the activations of a braking system;

the vehicle load sensor is operable to:

sense weights of a plurality of loads being carried by the associated following vehicle; and generate plural load data representative of the plurality of loads being carried by the associated following vehicle;

the vehicle braking pressure sensor is operable to:
sense pressures of the braking system of the associated following vehicle during plural activations of the braking system; and
generate plural pressure data representative of the sensed braking pressures;

the vehicle antilock braking system sensor is operable to:
sense activations of an ABS system of the associated following vehicle during the plural activations of the braking system; and
generate plural ABS data representative of the sensed ABS activations; and the logic of the platoon control unit is executable by the processor to generate the first braking quality data in accordance with a predetermined combination of the plural relative speed data, the plural timer interval data, the plural load data, the plural pressure data, and the plural ABS data.

11. The vehicle control system according to claim 10, further comprising:
a communication transmitter operatively coupled with the platoon control unit, the communication transmitter being operable to:
convert the first braking quality data into a first braking quality data signal; and
transmit the first braking quality data signal from the associated following vehicle to the associated leading vehicle for use by the associated leading vehicle to make a platoon ordering control decision relative to the following vehicle.

12. The vehicle control system according to claim 11, further comprising:
a communication receiver operatively coupled with the platoon control unit, the communication receiver being operable to:
receive a second braking quality data signal from the associated leading vehicle, the second braking quality data signal being representative of a dynamic braking capability of the associated leading vehicle;
convert the second braking quality data into a second braking quality data signal; and
communicate the second braking quality data signal to the platoon control unit for processing by the logic for making a platoon ordering control decision of the associated following vehicle relative to the associated leading vehicle based on their respective dynamic braking capabilities.

13. The vehicle control system according to claim 12, wherein the logic of the platoon control unit is executable by the processor to generate, in accordance with the second braking quality data signal, a following distance command signal representative of a following distance to be maintained by the associated following vehicle relative to the associated leading vehicle based on the dynamic braking capability of the associated following vehicle relative to the dynamic braking capability of the associated leading vehicle.

14. A vehicle control method comprising:
providing a platoon control unit configured to be disposed in an associated following vehicle of a set of platooning vehicles comprising the associated following vehicle and an associated leading vehicle cooperatively travelling as a platoon along an associated roadway, the platoon control unit comprising a processor, a non-transient memory device operatively coupled with the processor, and logic stored in the non-transient memory and executable by the processor to determine a braking capability of the associated following vehicle;

using a vehicle speed sensor operatively coupled with the platoon control unit and configured to be disposed in the associated following vehicle:
sensing a speed of the associated following vehicle; and
generating speed data representative of the sensed speed of the associated following vehicle;

using a vehicle brake pressure sensor operatively coupled with the platoon control unit and configured to be disposed in the associated following vehicle:
sensing brake activation pressure of a braking system of the associated following vehicle; and using a timer operatively coupled with the platoon control unit and configured to be disposed in the associated following vehicle:
generate timer interval data representative of a time difference between an initiation time of a selected braking event and a termination time of the selected braking event, executing the logic of the platoon control unit by the processor to:
determine a first vehicle braking sensitivity during a first deceleration of the associated following vehicle that commences at the platoon control unit receiving a first deceleration command signal representative of a first desired deceleration based on:
a first initial speed of the associated following vehicle at a first initiation time of the first deceleration determined based on the speed data generated by the vehicle speed sensor at the first initiation time of the first deceleration;
a first brake activation pressure of the braking system of the associated following vehicle determined based on the brake pressure data generated by the vehicle brake pressure sensor during the first deceleration;
a first termination speed of the associated following vehicle at a first termination time of the first deceleration determined based on the speed data generated by the vehicle speed sensor at the first termination time of the first deceleration; and
a first deceleration time interval determined based on a first time difference between the first initiation time and the first termination time of the first deceleration based on first timer interval data generated by the timer representative of a time difference between the first initiation and termination times of the first deceleration;
determine a first vehicle response delay during the first deceleration based on the first deceleration time interval, wherein the first vehicle response delay comprises: a first component comprising an amount of time during the first deceleration that passes between the platoon control unit receiving the first deceleration command signal and activation of the braking system of the associated following vehicle; and a second component comprising an amount of time that passes during the first deceleration between the activation of the braking system and the associated following vehicle reaching the first desired deceleration;
determine a second vehicle braking sensitivity during a second deceleration of the associated following vehicle that commences at the platoon control unit receiving a second deceleration command signal representative of a second desired deceleration based on:
    a second initial speed of the associated following vehicle at a second initiation time of the second deceleration determined based on the speed data generated by the vehicle speed sensor at the second initiation time of the second deceleration;
    a second brake activation pressure of the braking system of the associated following vehicle determined based on the brake pressure data generated by the vehicle brake pressure sensor during the second deceleration;
    a second termination speed of the associated following vehicle at a second termination time of the second deceleration determined based on the speed data generated by the vehicle speed sensor at the second termination time of the second deceleration; and
    a second deceleration time interval determined based on a second time difference between the second initiation time and the second termination time of the second deceleration based on second timer interval data generated by the timer representative of a time difference between the second initiation and termination times of the second deceleration;
determine a second vehicle response delay during the second deceleration based on the second deceleration time interval, wherein the second vehicle response delay comprises: a first component comprising an amount of time during the second deceleration that passes between the platoon control unit receiving the second deceleration command signal and activation of the braking system of the associated following vehicle; and a second component comprising an amount of time that passes during the second deceleration between the activation of the braking system and the associated following vehicle reaching the second desired deceleration; and
generate first braking quality data in accordance with a predetermined combination of the first and second vehicle response delays and the first and second vehicle braking sensitivities, the first braking quality data being representative of the dynamic braking capability of the associated following vehicle.

15. The vehicle control method according to claim 14, further comprising:
using a vehicle load sensor operatively coupled with the platoon control unit and configured to be disposed in the associated following vehicle:
    sensing a weight of a load being carried by the associated following vehicle; and
    generating load data representative of the load being carried by the associated following vehicle;
using a vehicle antilock braking system (ABS) sensor operatively coupled with the platoon control unit and configured to be disposed in the associated following vehicle:
    sensing an activation of an ABS system of the associated following vehicle during the activation of the braking system; and
    generating ABS data representative of the sensed ABS activation.

16. The vehicle control method according to claim 15, further comprising executing the logic of the platoon control unit by the processor to:

generate the first braking quality data in accordance with a predetermined combination of the first and second vehicle response delays and the first and second vehicle braking sensitivities, the load data, and the ABS data.

17. The vehicle control method according to claim 15, further comprising:
operating the vehicle speed sensor to:
    generate plural relative speed data representative of sensed speeds of the associated following vehicle;
operating the vehicle brake pressure sensor to:
    sense brake pressure activations of a braking system of the associated following vehicle;
operating the timer to:
    determine plural timer interval data representative of time differences between the activations of a braking system;
operating the vehicle load sensor to:
    sense weights of a plurality of loads being carried by the associated following vehicle; and
    generate plural load data representative of the plurality of loads being carried by the associated following vehicle;
operating the vehicle braking pressure sensor to:
    sense pressures of the braking system of the associated following vehicle during plural activations of the braking system; and
    generate plural pressure data representative of the sensed braking pressures;
operating the vehicle antilock braking system sensor to:
    sense activations of an ABS system of the associated following vehicle during the plural activations of the braking system; and
    generate plural ABS data representative of the sensed ABS activations; and
executing the logic of the platoon control unit by the processor to generate the first braking quality data in accordance with a predetermined combination of the plural relative speed data, the plural timer interval data, the plural load data, the plural pressure data, and the plural ABS data.

18. The vehicle control method according to claim 17, further comprising:
operating a communication transmitter coupled with the platoon control unit to:
    convert the first braking quality data into a first braking quality data signal; and
    transmit the first braking quality data signal from the associated following vehicle to the associated leading vehicle for use by the associated leading vehicle to make a platoon ordering control decision relative to the following vehicle.

19. The vehicle control method according to claim 18, further comprising:
operating a communication receiver coupled with the platoon control unit to:
    receive a second braking quality data signal from the associated leading vehicle, the second braking quality data signal being representative of a dynamic braking capability of the associated leading vehicle;
    convert the second braking quality data into a second braking quality data signal; and
    communicate the second braking quality data signal to the platoon control unit for processing by the logic for making a platoon ordering control decision of the associated following vehicle relative to the associated leading vehicle based on their respective dynamic braking capabilities.

20. The vehicle control method according to claim 19, further comprising executing the logic of the platoon control unit by the processor to generate, in accordance with the second braking quality data signal, a following distance command signal representative of a following distance to be maintained by the associated following vehicle relative to the associated leading vehicle based on the dynamic braking capability of the associated following vehicle relative to the dynamic braking capability of the associated leading vehicle.

* * * * *